(12) United States Patent
Mayell et al.

(10) Patent No.: US 11,824,438 B2
(45) Date of Patent: Nov. 21, 2023

(54) DEADTIME ADJUSTMENT FOR A POWER CONVERTER

(71) Applicant: POWER INTEGRATIONS, INC., San Jose, CA (US)

(72) Inventors: Robert J. Mayell, Los Altos, CA (US); Yueming Wang, Gilroy, CA (US); Roger Colbeck, Ottawa (CA); Paul Walter DeMone, Kanata (CA); Steven Greig Porter, Nepean (CA); Robert W. Busse, San Jose, CA (US); Sorin S. Georgescu, Gilroy, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 211 days.

(21) Appl. No.: 17/311,266

(22) PCT Filed: Nov. 26, 2019

(86) PCT No.: PCT/US2019/063277
§ 371 (c)(1),
(2) Date: Jun. 4, 2021

(87) PCT Pub. No.: WO2020/123144
PCT Pub. Date: Jun. 18, 2020

(65) Prior Publication Data
US 2022/0123647 A1  Apr. 21, 2022

Related U.S. Application Data

(60) Provisional application No. 62/779,277, filed on Dec. 13, 2018.

(51) Int. Cl.
*H02M 1/38* (2007.01)
*H02M 1/00* (2006.01)
(Continued)

(52) U.S. Cl.
CPC ............ *H02M 1/38* (2013.01); *H02M 1/0058* (2021.05); *H02M 3/33571* (2021.05); *H02M 1/0029* (2021.05); *H02M 3/01* (2021.05)

(58) Field of Classification Search
CPC .......... H02M 1/38; H02M 3/156; H02M 1/08; H02M 1/0009; H02M 3/1588; H02M 3/158; H02M 1/0029
See application file for complete search history.

(56) References Cited

U.S. PATENT DOCUMENTS 5,446,404 A  *  8/1995  Badyal ................. H03K 17/223
                                                              327/143
10,110,221 B1 * 10/2018 Sharma ................ H03K 17/063
(Continued)

OTHER PUBLICATIONS

TEA19161T—Digital Controller for High-Efficiency Resonant Power Supply, Rev. 1, Mar. 10, 2016, 46 pages.
(Continued)

*Primary Examiner* — Gustavo A Rosario-Benitez
(74) *Attorney, Agent, or Firm* — Christensen O'Connor Johnson Kindness PLLC

(57) ABSTRACT

A controller includes first and second half bridge sense circuits coupled to a half bridge node. The half bridge node is coupled between a high side switch and a low side switch coupled to an input. A rising slew detection circuit is coupled to the first half bridge sense circuit to output a first slew detection signal in response to a rising slew event at the half bridge node. A falling slew detection circuit is coupled to the second half bridge sense circuit to output a second slew detection signal in response to a falling slew event at the half bridge node. A control circuit coupled to output a high side drive signal to the high side switch and a low side drive signal to the low side switch in response to the first slew detection signal, the second slew detection signal, and a feedback signal.

11 Claims, 15 Drawing Sheets

(51) Int. Cl.
*H02M 3/00* (2006.01)
*H02M 3/335* (2006.01)

(56) References Cited

U.S. PATENT DOCUMENTS

| | | | |
|---|---|---|---|
| 10,224,817 B1* | 3/2019 | Sharma | H02M 3/1588 |
| 10,461,732 B1* | 10/2019 | Norling | H03K 17/166 |
| 2005/0068089 A1 | 3/2005 | Balakrishnan | |
| 2008/0259656 A1* | 10/2008 | Grant | H02M 3/33523 |
| | | | 363/21.18 |
| 2009/0273957 A1* | 11/2009 | Feldtkeller | H02M 1/38 |
| | | | 363/98 |
| 2012/0043950 A1* | 2/2012 | Truong | H02M 3/158 |
| | | | 323/282 |
| 2017/0012618 A1* | 1/2017 | Krishna | H03K 17/166 |
| 2017/0302178 A1 | 10/2017 | Bandyopadhyay et al. | |
| 2018/0248473 A1* | 8/2018 | Huang | H02M 1/32 |
| 2019/0199209 A1* | 6/2019 | Shao | H02M 3/157 |
| 2019/0229634 A1* | 7/2019 | Moon | H02M 3/33592 |
| 2020/0076303 A1* | 3/2020 | Särkkä | H02M 3/158 |

OTHER PUBLICATIONS

International Application No. PCT/US2019/063277—International Search Report and Written Opinion, dated Mar. 16, 2020, 18 pages.

\* cited by examiner

DEADTIME ADJUSTMENT FOR A POWER CONVERTER

CROSS-REFERENCE TO RELATED APPLICATION

The application claims priority to International Patent Application No. PCT/US2019/063277, filed on Nov. 26, 2019, which claims the benefit of U.S. Provisional Application No. 62/779,277 filed Dec. 13, 2018, the contents of which are incorporated herein by reference in their entirety.

BACKGROUND INFORMATION

Field of the Disclosure

The present invention relates generally to power converters, and more specifically for varying the deadtime to ensure zero voltage switching in an LLC converter.

Background

Switch mode power supplies are used in a wide variety of household or industrial appliances that require a regulated direct current (dc) voltage for their operation. A controller for switch mode power supplies for controlling the power switch for the transfer of energy can use PWM (pulse width modulation) or PFM (pulse frequency modulation) to regulate the output voltage.

One type of power supply topology is a resonant switched mode power supply. Resonant switched mode power supplies have some advantages, which include having sinusoidal waveforms and intrinsic soft switching compared to non-resonant converters. Resonant switched mode power supplies can also operate at higher switching frequencies with low switching loss, utilize smaller magnetic elements, which therefore require smaller packaging, and still operate with high efficiency. Since resonant switched mode power supplies generally do not have waveforms with sharp edges (e.g., waveforms having high di/dt or dv/dt) EMI performance is improved, which therefore enables the use of smaller EMI filters. The output of a resonant switched mode power supply is often achieved by sensing the output and controlling power supply in a closed loop by varying the switching frequency.

LLC converters are a type of resonant switched mode power supply, which utilizes the resonance between two inductors and a capacitor. LLC converters are popular due to the savings on cost and size, which can be realized by utilizing the magnetizing and leakage inductance of the transformer as at least a part of the resonance component of the LLC converter. In addition, LLC converters can achieve improved efficiency when they are operated with zero voltage switching, which results in less switching loss and increased efficiency.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
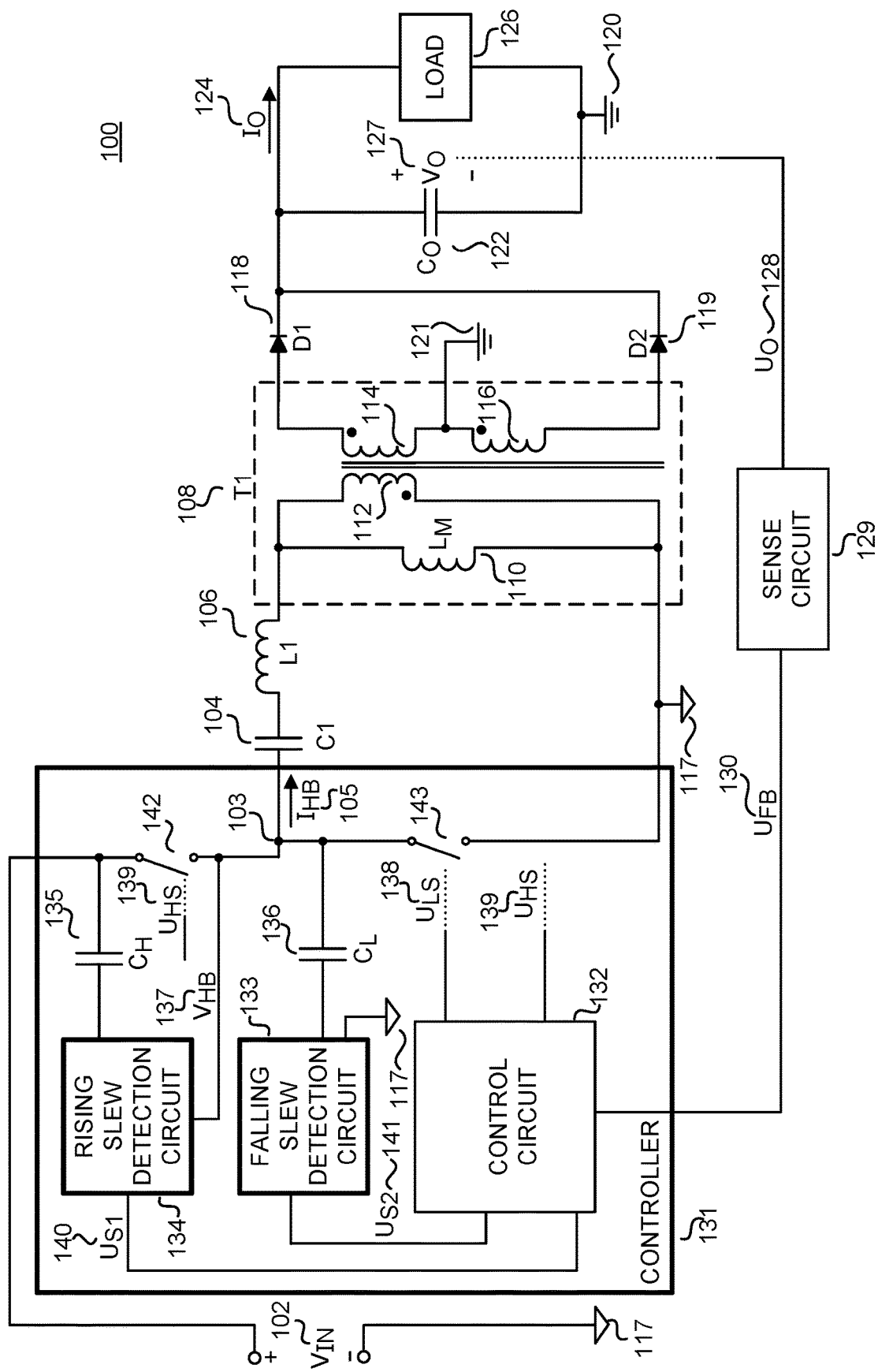
FIG. 1 shows a block diagram schematic of one example of a half bridge LLC power converter that includes a controller with a high side slew detection and falling slew detection circuit, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples related to a controller that adjusts the deadtime of a resonant converter are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Systems using LLC converters usually include an ac-dc front end stage to convert an ac signal received from a low frequency (60 or 50 Hz) ac network to a dc input received by the resonant converter stage. The LLC converter has two resonant frequencies, namely a series resonant frequency and a parallel resonant frequency, and is typically designed to operate in a range between these resonant frequencies in which the gain of the circuit has a negative gain with respect to increasing frequency, meaning that an increase in frequency decreases the energy transferred to the output of the power converter. Resonant power converters take advantage of a soft switching control in order to provide high output voltages without the penalty of high switching losses, high switching stress on the power switch, and high EMI noise caused by the fast switching edges.

One variant of an LLC converter is the half bridge topology, which refers to the type of rectification on the output windings of the transformer. During normal operation in a half bridge topology, the half bridge current lags the half bridge voltage due to a primarily inductive nature of the resonant tank in this range, so that the LLC can be operated to advantage with ZVS (zero voltage switching). ZVS occurs when the voltage across a switch to be turned-on, reaches zero or a minimum value at (or before) switching time. Thus, energy store in any capacitance across the switch is also at or near zero. The use of ZVS reduces the harmonic spectrum of any EMI and generally allows high efficiency at a higher switching frequency for a power converter.

In a half-bridge configuration, the deadtime is considered to be a period after switching off one switch and before switching on the other switch. For an LLC circuit to operate with ZVS, the deadtime selection is an important parameter to follow. The deadtime allows the voltage at the half bridge node to reach either zero volts at the return rail prior to the low side switch turning ON, or the voltage half bridge node reaching the positive input voltage rail prior to the high side switch turning ON. During the deadtime, both the high side switch and low side switch are turned OFF. The addition of a deadtime is inserted between the ON time of the high side switch and at the beginning of the ON time of the low side switch such that both switches are not simultaneously conducting. At the end of the deadtime, either the high side switch or low side switch is allowed to be turned ON. The deadtime for turning ON the high side switch and the low side switch ON are generally equivalent. The rate at which the voltage at the half bridge node changes during deadtime is dependent on resonant tank current (the sum of the magnetizing and leakage inductance currents). The rate at which the voltage on the half-bridge node changes during deadtime is also dependent on the combined capacitance presented at the half-bridge node. Likewise, the rate at which the half-bridge changes voltage during deadtime may also be a function of input voltage and output load conditions. A change in the magnetizing inductance, leakage inductance, half-bridge capacitance, input voltage and output load conditions may all independently generate a different half-bridge slew period. In the teachings of the present disclosure, the controller can adjust the deadtime regulation in response to the magnetizing, leakage inductance, half-bridge capacitance and changes in input voltage and output load conditions.

In one embodiment, a high voltage capacitor is used to detect the slew of a drain with the capacitor current. In examples in accordance with the teachings of the present invention, the deadtime begins when the voltage at the half bridge node crosses below a threshold. In another embodiment, the controller includes an adaptive deadtime circuit that adjusts the deadtime in response to a threshold detection circuit. In a further embodiment, the controller detects the Miller gate charge of the switches to adjust the deadtime. In another embodiment, a structure that provides a reliable way to obtain the slew rate (dv/dt) of a node includes a cross section of a metal insulator metal capacitor.

To illustrate, FIG. 1 shows a functional block diagram of an example power converter 100 including an input voltage $V_{IN}$ 102, a controller 131, a first capacitor C1 104, a first inductor L1 106, an energy transfer element T1 108, an input return 117, a first rectifier D1 118, a second rectifier D2 119, an output return 120, an output capacitor $C_O$ 122, a load 126, and a sense circuit 129.

Energy transfer element T1 108 further includes a first capacitor C1 104, a resonant (sometimes referred to as leakage) inductance L1 106, a magnetizing inductor $L_M$ 110, an input winding 112, a first output winding 114, and a second output winding 116. In some examples the inductance of inductor L1 106 may be embedded properties of the energy transfer element T1 108 such inductor L1 106 and inductor $L_M$ 110 are not discrete physical components.

The controller 131 further includes a control circuit 132, a falling slew detection circuit 133, a rising slew detection circuit 134, a high side capacitor $C_H$ 135, and a low side CL capacitor 136. The high side switch 142 is coupled to receive a high side signal $U_{HS}$ 139 and the low side switch 143 is coupled to receive a low side signal $U_{LS}$ 138 from the control circuit 132. FIG. 1 further illustrates a first slew signal $U_{S1}$ 140, a second slew signal $U_{S2}$ 141, and a half bridge voltage $V_{HB}$ 137.

The example switched mode power converter 100 illustrated in FIG. 1 is coupled in a half bridge LLC configuration, which is just one example of a switched mode power converter that may benefit from the teachings of the present invention. It is appreciated that other known topologies and configurations of switched mode power converters may also benefit from the teachings of the present invention.

The power converter 100 provides power to the output load 126 from an input voltage $V_{IN}$ 102. In one example, the input voltage $V_{IN}$ 102 is a substantially DC voltage. In one example the input voltage $V_{IN}$ 102, may be coupled to a rectified and filtered AC-input voltage. The high side switch 142 is coupled to receive the input voltage $V_{IN}$ 102 from a first end of the high side switch 142. The second end of high side switch 142 is coupled to a first end of the low side switch 143 and the half bridge node 103. The second end of low side switch 143 is further coupled to the input return 117. The first capacitor C1 104 is coupled to a first inductor L1 106 and the energy transfer element T1 108. First capacitor C1 104, first inductor L1 106 and energy transfer element T1 108, may function together as a tank circuit. It is understood by one skilled in the art, that the series connections of first capacitor C1 104, first inductor L1 106 and energy transfer element T1 108 may be rearranged without changing the function of these components circuit. In other words, the series connection may be C1, L1, T1, or L1, C1, T1, or L1, T1, C1. The energy transfer element T1 108 may transfer energy from input winding 112 to the output windings 114 and 116. First output winding 114 is coupled to a first rectifier D1 118. In one example, the first rectifier D1 118 is a diode. However, in some embodiments, the first rectifier D1 118 may be a transistor used as a synchronous rectifier. Energy is transferred and rectified by first rectifier D1 118 when the high side switch 142 is turned ON and the low side switch 143 is OFF.

The second output winding 116 is coupled to second rectifier D2 119. In one example, the second rectifier D2 119 is a diode. However, in some embodiments, the second rectifier D2 119 may be a transistor used as a synchronous rectifier. Energy is transferred and rectified by rectifier D2 119 when the high side switch 142 is turned OFF and the low side switch 143 is ON. Output load 126 is coupled to the first rectifier D1 118, second rectifier D2 119 and output capacitor $C_O$ 122. Output capacitor $C_O$ 122 which may be used to filter the output. First capacitor C1 104, first inductor L1 106, energy transfer element T1 108 may function together as a tank circuit whose load may be coupled to the output load 126 via rectifiers D1 and D2. An output quantity $U_O$ 128 is provided to the load 126 from the energy transfer element T1 108.

The power converter 100 further comprises circuitry to regulate the output, which is exemplified the output quantity $U_O$ 128. In general, the output quantity $U_O$ 128 is either an output voltage $V_O$ 127, an output current $I_O$ 124, or a combination of the two. A sense circuit 129 is coupled to sense the output quantity $U_O$ 128 and to provide a feedback signal $U_{FB}$ 130, which is representative of the output quantity $U_O$ 128. Feedback signal $U_{FB}$ 130 may be a voltage signal or a current signal.

In one example, there may be a galvanic isolation (not shown) between the controller 131 and the sense circuit 129. The galvanic isolation may be implemented by using devices such as an opto-coupler, a capacitor or a magnetic coupling. In a further example, the sense circuit 129 may utilize a voltage divider to sense the output quantity $U_O$ 128 from the output of the power converter 100. In yet a further example sense circuit 129 may utilize a current sensor of the output quantity $U_O$ 128. In yet a further example sense circuit 129 may sense the energy transferred by T1 as the output quantity $U_O$ 128.

Controller 131 is coupled to the sense circuit 129 and receives the feedback signal $U_{FB}$ 130 from the sense circuit 129. In addition, controller 131 provides a high side drive signal $U_{HS}$ 139 to the high side switch 142, and a low side drive signal $U_{LS}$ 138 to the low side switch 143 to control various switching parameters to control the transfer of energy from the input of power converter 100 to the output of power converter 100. For a resonant converter, the output voltage is regulated by adjusting the switching frequency. The switching frequency can be decreased when the output is below regulation, and the switching frequency can be increased when the output is above regulation. Generally during normal operation the duty cycle of a LLC half bridge is substantially fifty percent for the low side switch and high side switch.

In operation, the deadtime occurs when the high side switch 142 and low side switch 143 are both open meaning that switches 142 and 143 are substantially OFF. The rising slew detection circuit 134 detects a rising voltage on the half bridge node 103 and outputs a first slew signal $U_{S1}$ 140 while the half bridge voltage 137 is rising. The low side detection circuit 136 detects a falling voltage on the half bridge node 103 and generates a second slew signal $U_{S2}$ 141 while the half bridge voltage 137 is falling. The control circuit 132 delays the high side signal in response to when the first slew signal $U_{S1}$ 140 signal is received. The control circuit 132 delays the low side drive signal in response to when the second slew signal $U_{S2}$ 141 is received. In one example, the control circuit 132 is further coupled to receive feedback signal $U_{FB}$ 130 to adjust the switching frequency of the high side and low side drive signals in response to the feedback signal $U_{FB}$ 130.

Figure 2A:
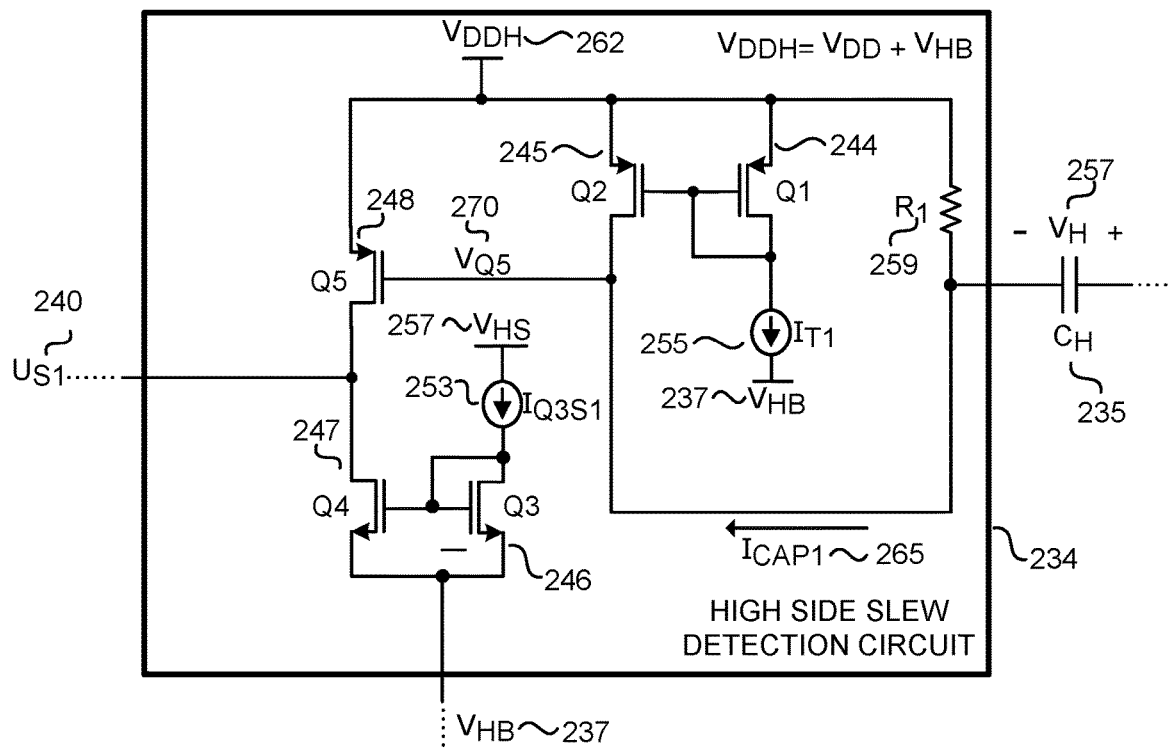
FIG. 2A shows a block diagram schematic of an example high side slew detection circuit, in accordance with the teachings of the present invention.
Figure 2B:
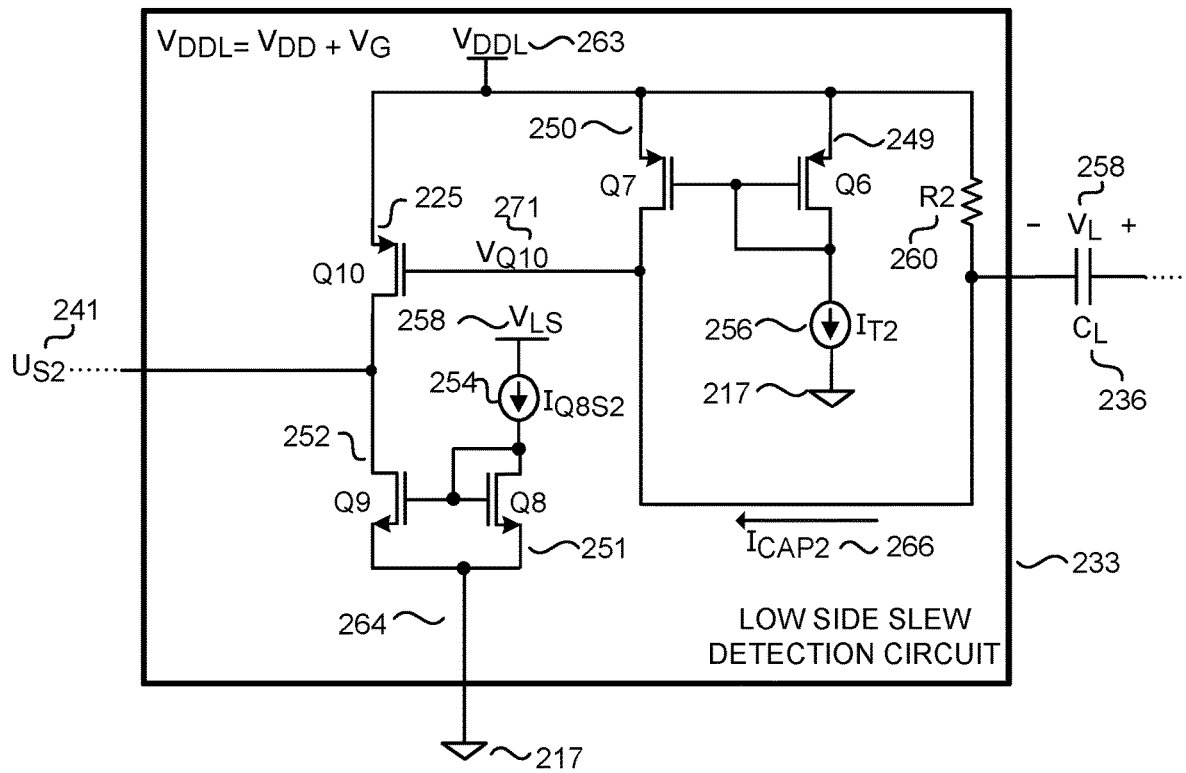
FIG. 2B shows a block diagram schematic of an example falling slew detection circuit, in accordance with the teachings of the present invention.

FIG. 2A and FIG. 2B illustrate a rising slew detection circuit, which generates the first slew signal $U_{S1}$, and a falling slew detection circuit, which generates the second slew signal $U_{S2}$. FIG. 2A illustrates the rising slew detection circuit 234. Prior to the operation, the high side switch 142 is OFF and the low side switch 143 is ON. The half bridge voltage $V_{HB}$ 237 is substantially at the voltage of input return 217. The low-side switch 143 is turned OFF. At this instant in one example, there is negative current $I_{HB}$ 105 in the resonant tank (C1, L1, T1). In one example there is non-zero capacitance $C_{HB}$ at the half-bridge node 103 (with respect to input return 117). The negative current $I_{HB}$ 105 will charge half-bridge capacitance and the voltage on the half bridge $V_{HB}$ 237 to slew upwards with respect to input return 117.

The rising slew detection circuit 234 is coupled to detect the current $I_{CAP1}$ 265 of the high side capacitor $C_H$ 235 during half-bridge voltage slew. In one example, the positive terminal of $C_H$ 235, is coupled to a fixed DC voltage. The negative terminal of $C_H$ 235 is coupled to the half-bridge node 103. The upwards slew of the half-bridge voltage coupled to $C_H$ 257 generates current. The magnitude of the $C_H$ 257 current generated is a function of rate of change of half-bridge voltage $$I_{CAP1} = C_H \frac{d(V_{INPUT\ RETURN} - V_{HB})}{dT_{HB\_S}} - I_{R1}$$

Where $T_{HB\_s}$ is the period of time taken for the half-bridge voltage $V_{HB}$ 103, to slew from the voltage of input return 117, to the voltage of input supply $V_{IN}$ 102. For a rising voltage on the half-bridge the current $I_{CAP1}$ 265 will be a negative value. Conversely for a falling voltage on the half-bridge the current $I_{CAP1}$ 265 will be a positive value. When there is a substantially constant voltage on the half-bridge the current $I_{CAP1}$ 265 will be substantially zero.

Current $IC_H$ from the negative terminal of $C_{HS}$ 235, flows into high-side slew detection circuit 234. Resistor R1 259 current is subtracted from ICH to yield current $I_{CAP1}$ 265 which determines if the voltage $V_{HB}$ 237 of the half bridge 103 is slewing upward. The rising slew detection circuit 234 includes a resistor R1 259, transistors 244, 245, 246, 247, and 248, and current sources 253 and 255. The voltage supply $V_{DDH}$ 262 is the supply rail. In one example, the voltage supply $V_{DDH}$ 262 includes a local supply VDD whose voltage is substantially fixed relative to the half bridge voltage $V_{HB}$ 237. In other words, VDD 262 moves up and down with changes in the half-bridge voltage but remains substantially fixed when measured differentially with respect to half-bridge. In one example, the substantially fixed local supply value could be >12 volts, with respect to $V_{HB}$ 237. The source terminals of transistors 246 and 247 are coupled to receive the half bridge voltage $V_{HB}$ 237.

Transistors Q1 244 and Q2 245 are coupled to form a current mirror. In one example, transistors Q1 244 and Q2 245 are PMOS transistors. The source of transistor Q1 244 and the source of transistor Q2 245 are coupled to the voltage supply $V_{DDH}$ 262. The gates of transistors Q1 244 and Q2 245 are coupled to the drain of transistor Q1 244. The drain of transistor Q1 244 is also coupled to current source $I_{T1}$ 255, which is also referred to as current threshold reference. Transistors Q1 244 and Q2 245 are coupled to function as a current mirror for the threshold reference current $I_{T1}$ 255. This mirrored current is output on the drain of Q2 245 when it couples to form current comparator with respect to current $I_{CAP1}$ 265. In one example $I_{CAP1}$ 265 is greater than $I_{T1}$ mirrored current, and the gate voltage VQ5 270 of transistor Q5 248 will transition low. In another example $I_{CAP1}$ 265 is less than $I_{T1}$ mirrored current, and the gate voltage of transistor Q5 248 will transition high.

In one example transistor Q5 248 is a PMOS device. The first slew signal $U_{S1}$ 240 will transition to a logic high in response to the drain current of transistor Q5 225 being greater than mirror reference current $I_{Q3S1}$ 253 (mirrored by coupled transistors Q3 246 and Q4 247). When the voltage $V_{HB}$ 137 at the half bridge node is no longer slewing (in other words the half-bridge voltage is substantially constant), the current in the high side capacitor $C_H$ 235 tends to zero, causing $I_{CAP1}$ 265 to also tend to zero and thus may be less than threshold current $I_{T1}$ 255, causing transistor Q5 225 to turn OFF. With Q5 255 turned OFF, Q5 drain current may fall below that of current reference IS1 253 (mirrored through coupled transistors Q3 246 and Q4 Q4), so the first slew signal $U_{S1}$ 240 transitions to a logic low.

When the half bridge voltage $V_{HB}$ 237 is at a constant value (for instance when the high side switch 142 is ON and the low side switch 143 is OFF), no current flows through the high side capacitor $C_H$ 235 and $I_{CAP1}$ 265 is substantially zero. The gate voltage $V_{Q5}$ 270 is determined by a current comparison of the capacitor current $I_{CAP1}$ 265 and the current mirror of transistors Q1 244 and Q2 245. In this example, the gate of transistor Q5 248 is pulled up to the supply rail $V_{DDH}$ 262 by resistor R1 259 and by transistor Q2 245, and transistor Q5 248 remains OFF. The first slew signal $U_{S1}$ 240 is a logic low when the gate of transistor Q5 245 holds at the local supply $V_{DDH}$ 262, which keeps transistor Q5 248 OFF.

In one example the current in the half-bridge $I_{HB}$ is positive, causing the half-bridge voltage $V_{HB}$ 103 to fall. The sense current $I_{CAP1}$ 265 may be positive under these conditions and the voltage on the gate of Q5 248, may be pulled above the local positive supply voltage $V_{DDH}$ 262 by a voltage defined by the lessor of the voltage generated by resistor R1 259 multiplied by $I_{CAP1}$ 265 or the voltage of a body diode of transistor Q2. Under these conditions the voltage on the gate of Q5 248 may rise above the local supply positive voltage $V_{DDH}$ 262 by a limited amount. The transistor Q5 will remain OFF during this condition, and the output of the first slew signal $U_{S1}$ 240 will be a logic low.

FIG. 2B illustrates low side slew detection circuit which generates the second slew signal $U_{S2}$. Prior to the operation, the high side switch 142 is OFF and the low side switch 143 is ON. The half bridge voltage $V_{HB}$ 237 is substantially at the voltage of input return 217. The low-side switch 143 is turned OFF. At this instant in one example, there is negative current $I_{HB}$ 105 in the resonant tank (C1, L1, T1). In one example there is non-zero capacitance $C_{HB}$ at the half-bridge node 103 (with respect to input return 117). The negative current $I_{HB}$ 105 will charge half-bridge capacitance and the voltage on the half bridge $V_{HB}$ 237 to slew upwards with respect to input return 117.

The low side slew detection circuit 233 is coupled to detect the current $I_{CAP2}$ 265 of the low side capacitor $C_L$ 236 during half-bridge voltage slew. In one example, the positive terminal of $C_L$ 236, is coupled to a fixed DC voltage. The negative terminal of $C_L$ 236 is coupled to the half-bridge node 103. The upwards slew of the half-bridge voltage coupled to $C_L$ 236 generates current. The magnitude of the $C_L$ 236 current generated is a function of rate of change of half-bridge voltage $$I_{CAP2} = C_L \frac{d(V_{INPUT\ RETURN} - V_{HB})}{dT_{HB\_S}} - I_{R2}$$

Where $T_{HB\_s}$ is the period of time taken for the half-bridge voltage $V_{HB}$ 103, to slew from the voltage of input return 117, to the voltage of input supply $V_{IN}$ 102. For a rising voltage on the half-bridge the current $I_{CAP2}$ 266 will be a negative value. Conversely for a falling voltage on the half-bridge the current $I_{CAP2}$ 266 will be a positive value. When there is a substantially constant voltage on the half-bridge the current $I_{CAP2}$ 266 will be substantially zero.

Current $I_{CH}$ from the negative terminal of $C_L$ 236, flows into low-side slew detection circuit 233. Resistor R2 260 current is subtracted from $I_{CH}$ to yield current $I_{CAP2}$ 266 which determines if the voltage $V_{HB}$ 237 of the half bridge 103 is slewing upward. The low slew detection circuit 234 includes a resistor R2 259, transistors 249, 250, 251, 252, 225, and current sources 254 and 256. The voltage supply $V_{DDL}$ 263 is the supply rail. In one example, the voltage supply $V_{DDL}$ 263 includes a local supply $V_{DD}$ whose voltage is substantially fixed relative to the half bridge voltage $V_{HB}$ 237. In other words, $V_{DD}$ 262 moves up and down with changes in the half-bridge voltage but remains substantially fixed when measured differentially with respect to half-bridge. In one example, the substantially fixed local supply value could be >12 volts, with respect to $V_{HB}$ 237. The source terminals of transistors 251 and 252 are coupled to the input return 217.

Transistors Q6 249 and Q7 250 are coupled to form a current mirror. In one example, transistors Q6 249 and Q7 250 are PMOS transistors. The source of transistor Q6 249 and the source of transistor Q7 250 are coupled to the voltage supply $V_{DDL}$ 263. The gates of transistors Q6 249 and Q7 250 are coupled to the drain of transistor Q6 249. The drain of transistor Q6 249 is also coupled to current source $I_{T2}$ 256, which is also referred to as current threshold reference. Transistors Q6 249 and Q7 250 are coupled to function as a current mirror for the threshold reference current $I_{T2}$ 256. This mirrored current is output on the drain of Q7 250 when it couples to form current comparator with respect to current $I_{CAP2}$ 266. In one example $I_{CAP2}$ 266 is greater than $I_{T2}$ mirrored current, and the gate voltage VQ10 271 of transistor Q10 225 will transition low. In another example $I_{CAP2}$ 266 is less than $I_{T2}$ mirrored current, and the gate voltage of transistor Q10 225 will transition high.

In one example transistor Q10 225 is a PMOS device. The second slew signal $U_{S2}$ 241 will transition to a logic high in response to the drain current of transistor Q10 225 being greater than mirror reference current $I_{Q8S2}$ 254 (mirrored by coupled transistors Q8 251 and Q9 252). When the voltage $V_{HB}$ 137 at the half bridge node is no longer slewing (in other words the half-bridge voltage is substantially constant), the current in the low side capacitor $C_L$ 236 tends to zero, causing $I_{CAP2}$ 266 to also tend to zero and thus may be less than threshold current $I_{T}2$ 256, causing transistor Q10 225 to turn OFF. With Q10 225 turned OFF, Q10 drain current may fall below that of current reference IQ8S2 255 (mirrored through coupled transistors Q8 251 and Q9 252), so the second slew signal $U_{S2}$ 241 transitions to a logic low.

When the half bridge voltage $V_{HB}$ 237 is at a constant value (for instance when the high side switch 142 is ON and the low side switch 143 is OFF), no current flows through the high side capacitor $C_L$ 236 and $I_{CAP2}$ 266 is substantially zero. The gate voltage $V_{Q10}$ 271 is determined by a current comparison of the capacitor current $I_{CAP2}$ 266 and the current mirror of transistors Q6 249 and Q7 250. In this example, the gate of transistor Q10 225 is pulled up to the supply rail $V_{DDL}$ 263 by resistor Re 250 and by transistor Q7 250, and transistor Q110 225 remains OFF. The second slew signal $U_{S2}$ 242 is a logic low when the gate of transistor Q10 225 holds at the local supply $V_{DDL}$ 263, which keeps transistor Q10 225 OFF.

In one example the current in the half-bridge $I_{HB}$ 104 is positive, causing the half-bridge voltage $V_{HB}$ 103 to fall. The sense current $I_{CAP2}$ 266 may be positive under these conditions and the voltage on the gate of Q10 225, may be pulled above the local positive supply voltage $V_{DDL}$ 263 by a voltage defined by the lessor of the voltage generated by resistor R2 260 multiplied by $I_{CAP2}$ 266 or the voltage of a body diode of transistor Q7 250. Under these conditions the voltage on the gate of Q10 225 may rise above the local supply positive voltage $V_{DDL}$ 263 by a limited amount. The transistor Q10 will remain OFF during this condition, and the output of the second slew signal $U_{S2}$ 241 will be a logic low.

Figure 3:
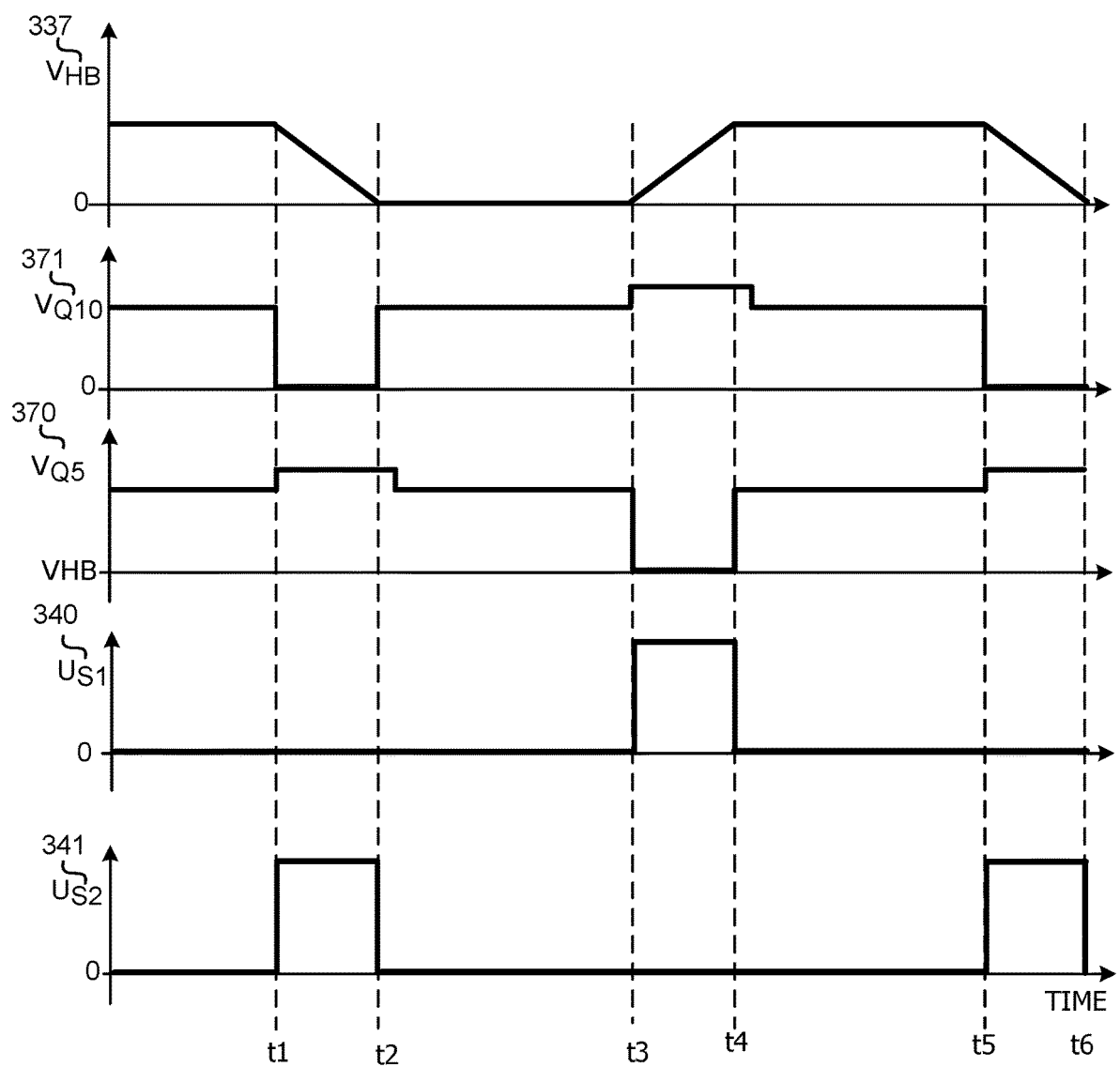
FIG. 3 illustrates an example timing diagram showing signals associated with the half bridge voltage, the voltage of the low side capacitor, the voltage of the high side capacitor signal, a first slew signal and a second slew signal, in accordance with the teachings of the present invention.

FIG. 3 illustrates an example timing diagram showing signals associated with the half bridge voltage, the gate voltage of the transistor Q5 of the rising slew detection circuit, the gate voltage of the transistor Q10 in the falling slew detection circuit, a first slew signal, and a second slew signal, in accordance with the teachings of the present invention. In particular, the first timing diagram illustrates the half bridge voltage $V_{HB}$ 337. The second timing diagram illustrates the gate voltage $V_{Q10}$ 371 of the transistor Q10 in the falling slew detection circuit. The third timing diagram illustrates the gate voltage $V_{Q5}$ 370 of the transistor Q5 in the rising slew detection circuit. The fourth timing diagram illustrates the first slew signal $U_{S1}$ 340. The fifth timing diagram illustrates the second slew signal $U_{S2}$ 341.

Before time t1, the high side switch 142 is closed and the low side switch 143 is open. The half bridge voltage $V_{HB}$ 337 is at the value of the input voltage $V_{IN}$ 102 and remains at that value for the time period before t1. Therefore, the slew rate (dv/dt) of the half bridge voltage $V_{HB}$ 337 is zero during the time period before t1. The voltage $V_{G5}$ 370 of the transistor Q5 and the voltage $V_{G10}$ 371 of the transistor Q10 remains unchanged. The first slew signal $U_{S1}$ 340 and the second slew signal US2 341 are both at a logic low value.

At time t1 to time t2, the half bridge voltage $V_{HB}$ 337 slopes downward when the high side switch 142 and the low side switch 143 are both open, and this denotes the deadtime section. The gate voltage $V_{Q10}$ 370 of the transistor Q10 225 drops to zero. The gate voltage $V_{Q5}$ 370 of the transistor Q5 248 rises slightly above positive supply rail voltage $V_{DDH}$ 262. The first slew signal $U_{S1}$ 340 remains at a logic low. The second slew signal US2 341 of the falling slew detection circuit transitions to a logic high because the slew rate of the half bridge voltage $V_{HB}$ 337 exceeds the threshold.

At time t2 to time t3, the half bridge voltage $V_{HB}$ 337 is zero when the high side switch 142 is open and the low side switch 143 is closed. The gate voltage $V_{Q10}$ 371 of the transistor Q10 225 is charged at time t2 and remains at a fixed voltage. The gate voltage $V_{Q5}$ 370 of the transistor Q5 248 drops slightly and remains at a fixed voltage. The first slew signal $U_{S1}$ 340 of the rising slew detection circuit remains at a logic low. The second slew signal $U_{S2}$ 341 of the falling slew detection circuit is at a logic low from time t2 to time t3.

At time t3 to time t4, the half bridge voltage $V_{HB}$ 337 is rising with an upward slope when the high side switch is open and low side switch is open, as this denotes the deadtime section. The gate voltage $V_{Q10}$ 371 of the transistor Q10 225 rises slightly at time t3, and remains above positive supply rail voltage $V_{DDL}$ 263 until t4. The gate voltage $V_{Q5}$ 370 of the transistor Q5 248 drops to the half bridge voltage $V_{HB}$ 337 because the half bridge voltage $V_{HB}$ 337 is rising relative to the input voltage $V_{IN}$ 102. The first slew signal $U_{S1}$ 340 of the rising slew detection circuit transitions to a logic high at time t3, and falls to zero at time t4. The second slew signal $U_{S2}$ 341 of the falling slew detection circuit remains at a logic low value.

At time t4 to time t5, the half bridge voltage $V_{HB}$ 337 is at the value of the input voltage $V_{IN}$ 102, and remains at that value for time period t4 to t5 when high side switch 142 is closed and the low side switch 143 is open. The gate voltage $V_{Q10}$ 371 of the transistor Q10 225 drops slightly and remains at a fixed voltage. The gate voltage $V_{Q5}$ 370 of the transistor Q5 248 remains at a fixed voltage. The first slew signal $U_{S1}$ 340 of the high slew detection circuit is a logic low because the slew rate of the half bridge voltage $V_{HB}$ 337 does not exceed the threshold current, in other words the half bridge voltage $V_{HB}$ 337 is no longer slewing. The second slew signal $U_{S2}$ 341 of the falling slew detection circuit remains at a logic low value.

At time t5 to time t6, the half bridge voltage $V_{HB}$ 337 slopes downward when the high side switch 142 and low side switch 143 are open. The gate voltage $V_{Q10}$ 371 of the transistor Q10 225 drops to zero. The voltage $V_{Q5}$ 370 of the transistor Q5 248 rises slightly above positive supply rail voltage $V_{DDH}$ 262. The first slew signal $U_{S1}$ 340 of the rising slew detection circuit remains at a logic low. The second slew signal $U_{S2}$ 341 of the falling slew detection circuit transitions to a logic high because the slew rate exceeds the threshold current.

Figure 4:
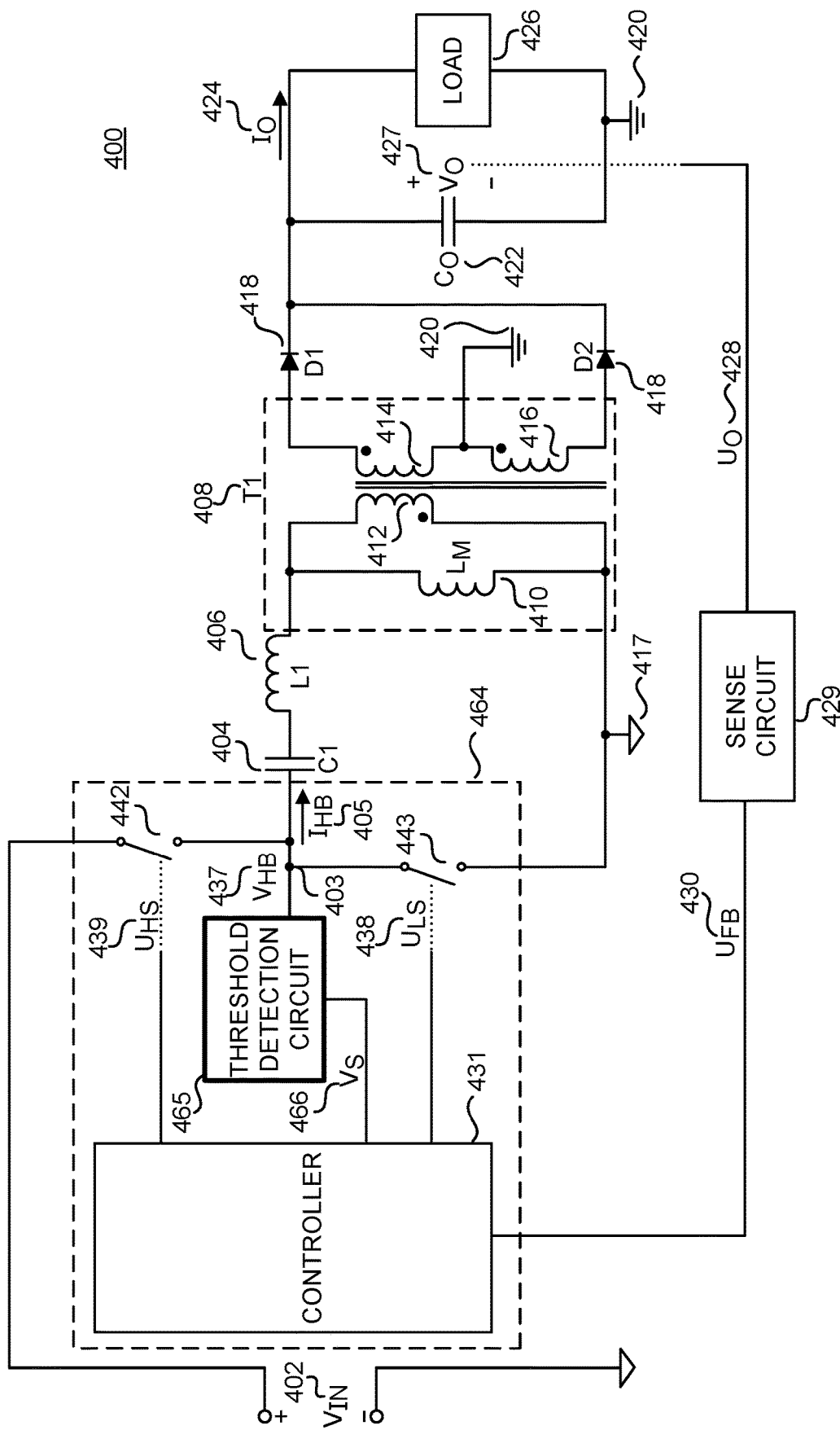
FIG. 4 shows a block diagram schematic of one example of a half bridge LLC power converter that includes a controller and a threshold detection circuit, in accordance with the teachings of the present invention.

FIG. 4 illustrates another example of an LLC power converter 400 that adjusts the deadtime in response to a threshold detection circuit. To illustrate, FIG. 4 shows a functional block diagram of an example power converter 400, which is illustrated as including an input voltage $V_{IN}$ 402, a controller 431, a first capacitor C1 404, a first inductor L1 406, an energy transfer element T1 408, an input return 417, a first rectifier D1 418, a second rectifier D2 419, an output return 420, an output capacitor $C_O$ 422, an output load 426, and a sense circuit 429.

Energy transfer element T1 408 further includes a magnetizing inductor $L_M$ 410, an input winding 412, a first output winding 414, and a second output winding 416. In some examples the inductance of inductor L1 406 may be embedded properties of the energy transfer element T1 408 such inductor L1 406 and inductor $L_M$ 410 are not discrete physical components.

The example switched mode power converter 400 illustrated in FIG. 4 is coupled in a half bridge LLC configuration, which is just one example of a switched mode power converter that may benefit from the teachings of the present invention. It is appreciated that other known topologies and configurations of switched mode power converters may also benefit from the teachings of the present invention.

The power converter 400 provides output power to the load 426 from an input voltage $V_{IN}$ 402. In one example, the input voltage $V_{IN}$ 402 is substantially DC voltage. In one example the input voltage $V_{IN}$ 102, may be coupled to a rectified and filtered AC-input voltage. The high side switch 442 is coupled to receive the input voltage $V_{IN}$ 402 at a first end of the high side switch 442. The second end of high side switch 442 is coupled to a first end of the low side switch 443 by half bridge node 403. In one example, the second end of low side switch 443 is further coupled to the input return 417. The first capacitor C1 404 is coupled to a first inductor L1 406 and energy transfer element T1 408. First capacitor C1 404, first inductor L1 406 and energy transfer element T1 408, may function together as a tank circuit. It is understood by one skilled in the art, that the series connections of first capacitor C1 404, first inductor L1 406 and energy transfer element T1 408 may be rearranged without changing the function of the circuit. In other words, the series connection may be C1, L1, T1, or L1, C1, T1, or L1, T1, C1. The energy transfer element T1 408 may transfer energy from the input winding 414 to the output windings 414 and 416. First output winding 414 is coupled to a first rectifier D1 418. In one example, the first rectifier D1 418 is a diode. However, in some embodiments, the first rectifier D1 418 may be a transistor used as a synchronous rectifier. Energy is transferred and rectified by first rectifier D1 418 when the high side switch 442 is turned ON and the low side switch 443 is turned OFF.

The second output winding 416 is coupled to second rectifier D2 419. In one example, the second rectifier D2 419 is a diode. However, in some embodiments, the second rectifier D2 419 may be a transistor used as a synchronous rectifier. Energy is transferred and rectified by rectifier D2 419 when the high side switch 442 is turned OFF and the low side switch 443 is ON. Output load 426 is coupled to the first rectifier D1 418 and second rectifier D2 419 and output capacitor $C_O$ 422. Output capacitor $C_O$ 422 which may be used to filter the output. First capacitor C1 404, first inductor L1 406, energy transfer element T1 108 may function together as a tank circuit whose load may be coupled to the output load 426 via rectifiers D1 and D2. An output quantity $U_O$ 428 is provided to the load 426. The power converter 400 further comprises circuitry to regulate the output, which is exemplified as the output quantity $U_O$ 428. In general, the output quantity $U_O$ 428 is either an output voltage Vo 427, an output current $I_O$ 424, or a combination of the two. A sense circuit 429 is coupled to sense the output quantity $U_O$ 428 and to provide a feedback signal $U_{FB}$ 430, which is representative of the output quantity $U_O$ 428. Feedback signal $U_{FB}$ 430 may be a voltage signal or a current signal of a combination thereof.

In one example, there may be a galvanic isolation (not shown) between the controller 431 and the sense circuit 429. The galvanic isolation could be implemented by using devices such as an opto-coupler, a capacitor, or a magnetic coupling. In a further example, the sense circuit 429 may utilize a voltage divider to sense the output quantity $U_O$ 428 from the output of the power converter 400. In yet a further example sense circuit 429 may utilize a current sensor the output quantity $U_O$ 428. In yet a further example sense circuit 429 may sense the energy transferred by T1 as the output quantity $U_O$ 428.

Controller 431 is coupled to the sense circuit 429 and receives the feedback signal $U_{FB}$ 430 from the sense circuit 429. In addition, controller 431 provides a high side drive signal $U_{HS}$ 439 to the high side switch 442, and a low side drive signal ULs 438 to the low side switch 443 to control various switching parameters to control the transfer of energy from the input of power converter 400 to the output of power converter 400. For a resonant converter, the output voltage is regulated by adjusting the switching frequency. The switching frequency can be decreased when the output is below regulation, and the switching frequency can be increased when the output is above regulation. Generally during normal operation the duty cycle of a LLC half bridge is substantially fifty percent for the low side switch 443 and high side switch 442.

The threshold detection circuit 465 is coupled to the half bridge node 403 and outputs a voltage sense signal $V_S$ 466. The controller 431 is coupled to be responsive to begin a period of a deadtime when the voltage sense signal $V_S$ 466 of the threshold detection circuit 465 drops below a threshold. In one example, the threshold is 30 volts. More details of how one example of the threshold detection circuit 465 operates in conjunction with controller 431 for adjusting the deadtime is described below with respect to FIG. 5.

Figure 5A:
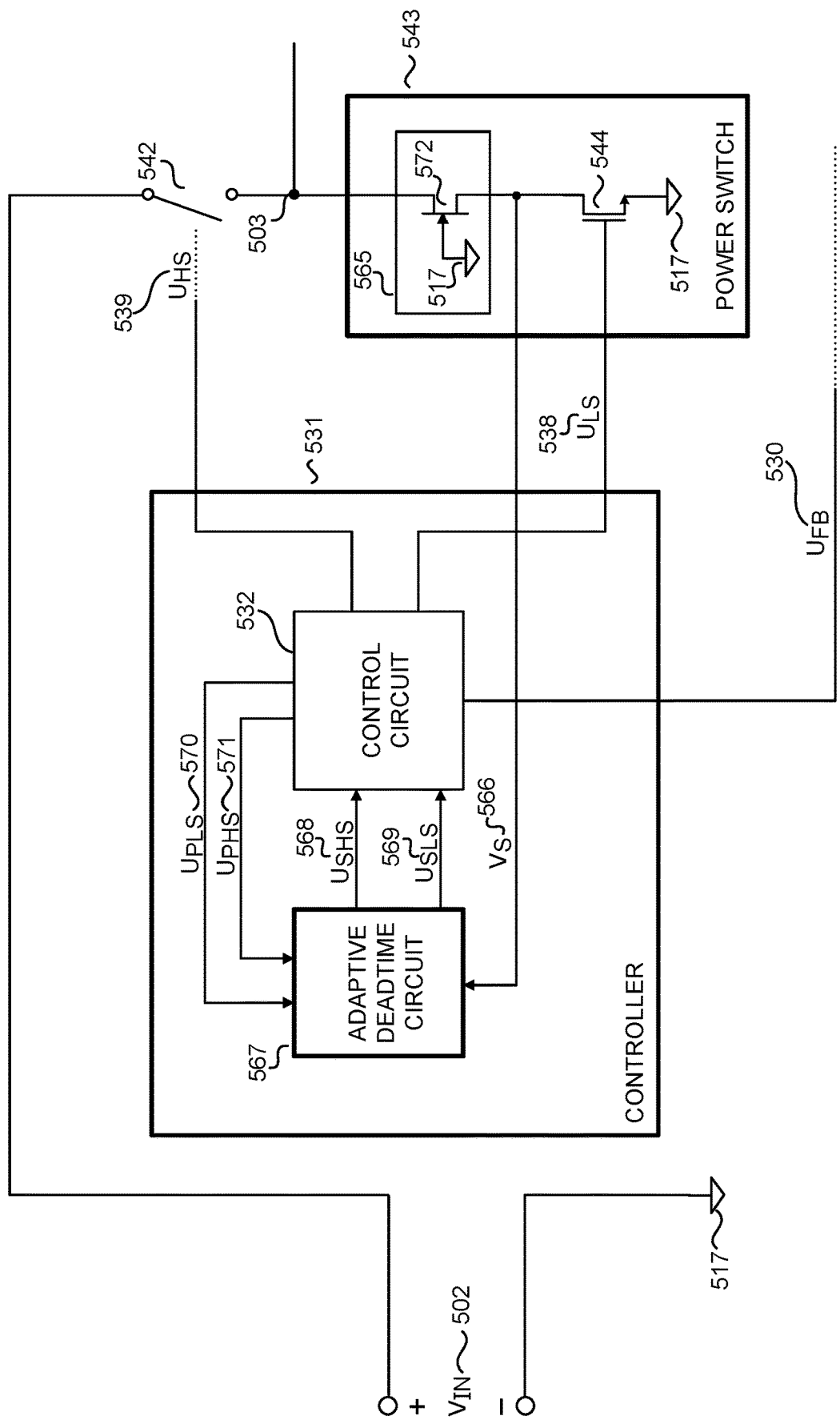
FIG. 5A shows a block diagram schematic of the example controller and threshold detection circuit of FIG. 4, in accordance with the teachings of the present invention.

FIG. 5 illustrates a block diagram of an example controller 531 and an example threshold detection circuit 565. Controller 531 includes a control circuit 532 and an adaptive deadtime circuit 567. The control circuit 532 is coupled to provide a pre-set low side signal $U_{PLS}$ 570 and pre-set high signal $U_{PHS}$ 571 to the adaptive deadtime circuit 567 in response to the feedback signal $U_{FB}$ 530. Control circuit 532 is further coupled to provide a high side signal $U_{HS}$ 539 to the high side switch 542, and a low side signal $U_{LS}$ 538 to the low side switch 543 respectively, in response to the set high side signal $U_{SHS}$ 568, and the set low side signal $U_{SLS}$ 569, respectively.

The example threshold detection circuit 565 depicted in FIG. 5 includes a junction field effect transistor (JFET) 572 to output voltage sense signal $V_S$ 566 in response to a voltage at half bridge node 503. The gate of JFET 572 is coupled to the input return 517. The drain of JFET 572 is coupled to the half bridge node 503, and the source of JFET 572 is coupled to provide the voltage sense signal $V_S$ 566 to the adaptive deadtime circuit 567. The relationship of the drain to source voltage of the JFET 572 to the gate to source voltage of JFET 572 can be expressed as follows:

$$V_{DS} = V_{GS} - V_P \quad (3)$$

where Vis is representative of the drain to source voltage of the JFET 572, $V_{GS}$ is representative of the gate to source voltage of JFET 572, and VP is representative of the pinch off voltage. In another example, the threshold detection circuit 565 may include a metal oxide semiconductor field effect transistor (MOSFET) instead of a JFET, or GaN HEMT FET. In a further example it understood that JFET 572 may be a standalone JFET or may be part of a casode JFET/MOSFET combination, which would include power-switch 543. However, additional biasing circuitry may be included.

As stated previously, the threshold detection circuit 565 provides a voltage sense signal $V_S$ 566 to the adaptive deadtime circuit 567. In one example, the period of deadtime begins when the voltage sense signal $V_S$ 566 drops below a threshold. The internal circuitry of the adaptive deadtime circuit 567 determines the end of the deadtime with the set high side signal $U_{SHS}$ 568 and the set low side signal $U_{SLS}$ 569 in order to turn ON the high side switch 542 or low side switch 543. Further details of the operation of the adaptive deadtime circuit are provided in FIG. 6.

Figure 5B:
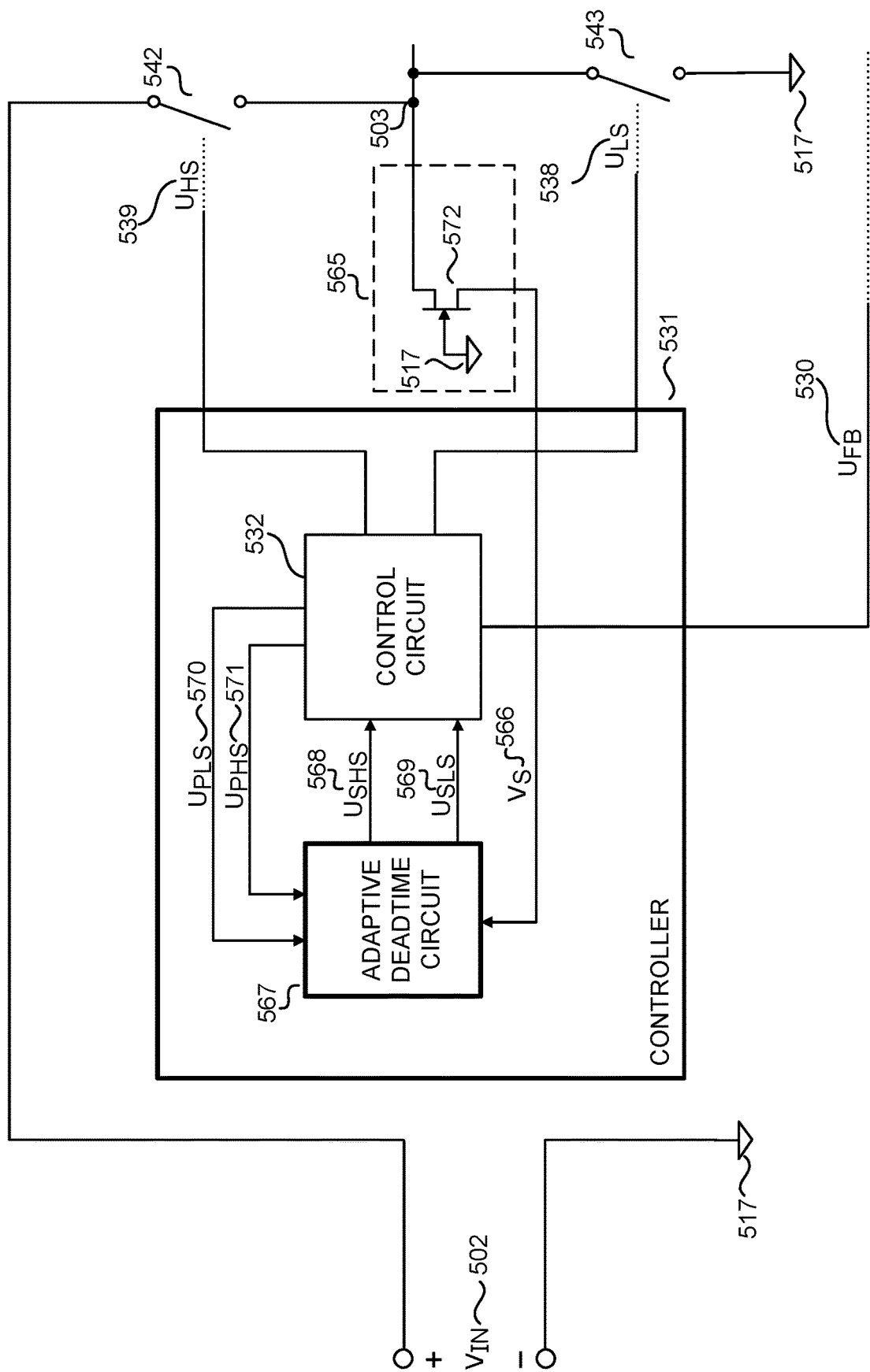
FIG. 5B shows another example of a block diagram schematic of the example controller and threshold detection circuit of FIG. 4, in accordance with the teachings of the present invention.

FIG. 5B shows another example of a block diagram schematic of the example controller and threshold detection circuit of FIG. 4, in accordance with the teachings of the present invention. FIG. 5B includes example controller 531 and an example threshold detection circuit 565. Controller 531 includes a control circuit 532 and an adaptive deadtime circuit 567. The control circuit 532 is coupled to provide a pre-set low side signal $U_{PLS}$ 570 and pre-set high signal $U_{PHS}$ 571 to the adaptive deadtime circuit 567 in response to the feedback signal $U_{FB}$ 530. Control circuit 532 is further coupled to provide a high side signal $U_{HS}$ 539 to the high side switch 542, and a low side signal $UL_S$ 538 to the low side switch 543 respectively, in response to the set high side signal $U_{SHS}$ 568, and the set low side signal $U_{S2S}$ 569, respectively.

The example threshold detection circuit 565 depicted in FIG. 5 includes a junction field effect transistor (JFET) 572 to output voltage sense signal $V_S$ 566 in response to a voltage at half bridge node 503. The gate of JFET 572 is coupled to the input return 517. The drain of JFET 572 is coupled to the half bridge node 503, and the source of JFET 572 is coupled to provide the voltage sense signal $V_S$ 566 to the adaptive deadtime circuit 567. The relationship of the drain to source voltage of the JFET 572 to the gate to source voltage of JFET 572 can be expressed as follows:

$$V_{DS}=V_{GS}-V_P \quad (3)$$

where $V_{DS}$ is representative of the drain to source voltage of the JFET 572, $V_{GS}$ is representative of the gate to source voltage of JFET 572, and $V_P$ is representative of the pinch off voltage. In another example, the threshold detection circuit 565 may include a metal oxide semiconductor field effect transistor (MOSFET) instead of a JFET. However, additional biasing circuitry may be included.

As stated previously, the threshold detection circuit 565 provides a voltage sense signal $V_S$ 566 to the adaptive deadtime circuit 567. In one example, the period of deadtime begins when the voltage sense signal $V_S$ 566 drops below a threshold. The internal circuitry of the adaptive deadtime circuit 567 determines the end of the deadtime with the set high side signal $U_{SHS}$ 568 and the set low side signal $U_{SLS}$ 569 in order to turn ON the high side switch 542 or low side switch 543.

Figure 6:
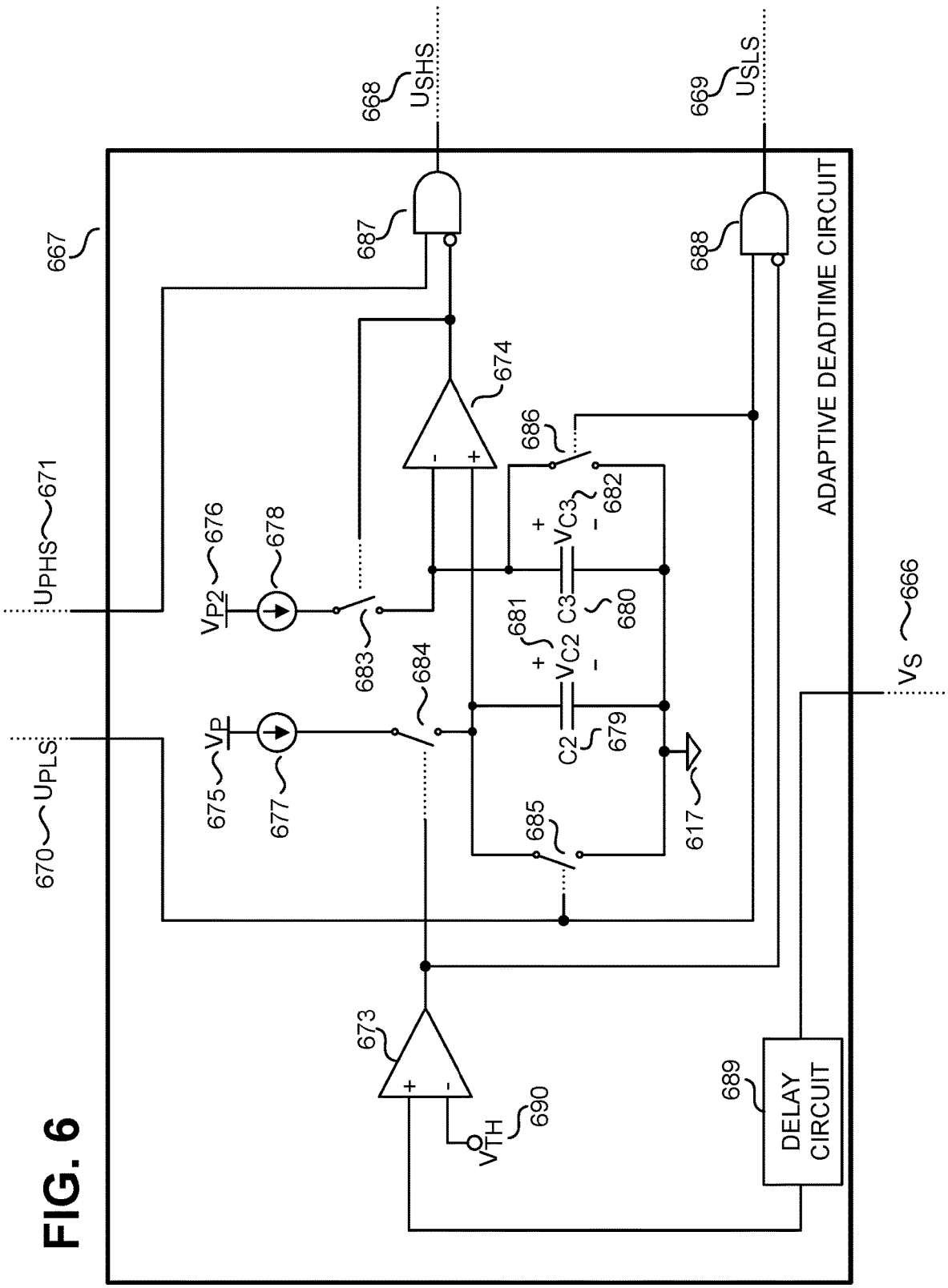
FIG. 6 shows a block diagram schematic of an example adaptive deadtime circuit, in accordance with the teachings of the present invention.

FIG. 6 illustrates a block diagram schematic of an example adaptive deadtime circuit 667. The adaptive deadtime circuit 667 is coupled to receive the pre-set low side signal $U_{PLS}$ 670, pre-set high side signal $U_{PHS}$ 671, and the voltage sense signal $V_S$ 666. Adaptive deadtime circuit 667 is further coupled to output the set high side signal $U_{SHS}$ 668, and the set low side signal $U_{SLS}$ 669. The set high side signal $U_{SHS}$ 668 and set low side signal $U_{SLS}$ 669 are signals that indicate to the control circuit 532 that it is time to switch ON either the high side switch 542 or the low side switch 543.

The adaptive deadtime circuit 667 includes a first comparator 673, a second comparator 674, a delay circuit 689, current sources 677 and 678, switches 683, 684, 685, and 686, a local return 617, and logic gates 687 and 688. The adaptive deadtime circuit 667 further includes a second capacitor C2 679 with a second voltage $V_{C2}$ 681, and a third capacitor C3 680 with a third voltage $V_{C3}$ 682.

In operation for determining when the low side switch 543 is set or ready to be turned ON, the adaptive deadtime circuit 667 is coupled to receive the pre-set low side signal $U_{PLS}$ 670. When the pre-set low side signal $U_{PLS}$ 670 is a logic high, switch 685 and switch 686 are closed. When switches 685 and 686 are closed, capacitor C2 679 and capacitor C3 680 are discharged to local return 617. The capacitor C2 679 should be completely discharged. The delay circuit 689 is coupled to receive the voltage sense signal $V_S$ 666 and generate a delayed voltage sense signal. The delayed voltage sense signal is coupled to the non-inverting input of the first comparator 673. The inverting input of the first comparator 673 is coupled to a voltage threshold reference $V_{TH}$ 690. In one example, the voltage threshold reference $V_{TH}$ 690 is 4 volts. First comparator 673 outputs a logic high when the delayed voltage sense signal is greater than the voltage threshold reference $V_{TH}$ 690. The output of first comparator 673 closes the switch 684. When the switch 684 is closed, current source 677 is coupled to a first voltage potential $V_P$ 670 that charges the second capacitor C2 679. Second capacitor C2 679 continues to charge until the delayed voltage sense signal drops below the voltage reference VREF. 690. The total time the second capacitor C2 679 is allowed to charge is greater than or equal the time of the delay circuit plus the time of the voltage sense signal $V_S$ 666 to fall to zero volts.

Logic gate 688 is coupled to receive the output of first comparator 673 and the pre-set low side signal $U_{PLS}$ 670. In one example, logic gate 688 is an AND gate with an inverter coupled to one of the inputs. Logic gate 688 is coupled to be responsive to the pre-set low signal $U_{PLS}$ 670 and the output of first comparator 673. The set low side signal $U_{SLS}$ 669 transitions to a logic high when the pre-set low signal $U_{PLS}$ 670 is a logic high, and the output of first comparator 673 is a logic low.

In operation for determining when the high side switch is set or ready to be turned ON, the adaptive deadtime circuit 667 is coupled to receive the pre-set high side signal $U_{PHS}$ 671. The second voltage $V_{C2}$ 681 of the second capacitor C2 679 is set as the reference value to the third capacitor C3 680. The second comparator 674 is coupled to receive the second voltage $V_{C2}$ 681 at the inverting input and the third voltage $V_{C3}$ 682 of the third capacitor C3 680 at the non-inverting input. The output of second comparator 674 is a logic high when the second voltage $V_{C2}$ 681 is greater than or equal to the third voltage $V_{C3}$ 682. The output of second comparator opens or closes switch 683. When the switch 683 is closed, current source 678 is coupled to a second voltage potential $V_{P2}$ 676 that charges the third capacitor C3 680. Third capacitor C3 680 continues to charge until the third voltage $V_{C3}$ 682 is greater than or equal to the second voltage $V_{C2}$ 681. Based on the equivalent time of charging for the second capacitor C2 679 and the third capacitor C3

659 to substantially the same voltage, the deadtime of the low side switch and the high side switch are substantially equal to allow ZVS operation. The output of second comparator 674 is coupled to logic gate 687. In one example, logic gate 687 is an AND gate. Logic gate 687 is coupled to receive the pre-set signal $U_{PHS}$ 671 and the inverted output of the second comparator 674. The set high side signal $U_{SHS}$ 668 transitions to a logic high when the output of second comparator 674 is a logic low and the pre-set high side signal $U_{PHS}$ 671 is a logic high.

Figure 7:
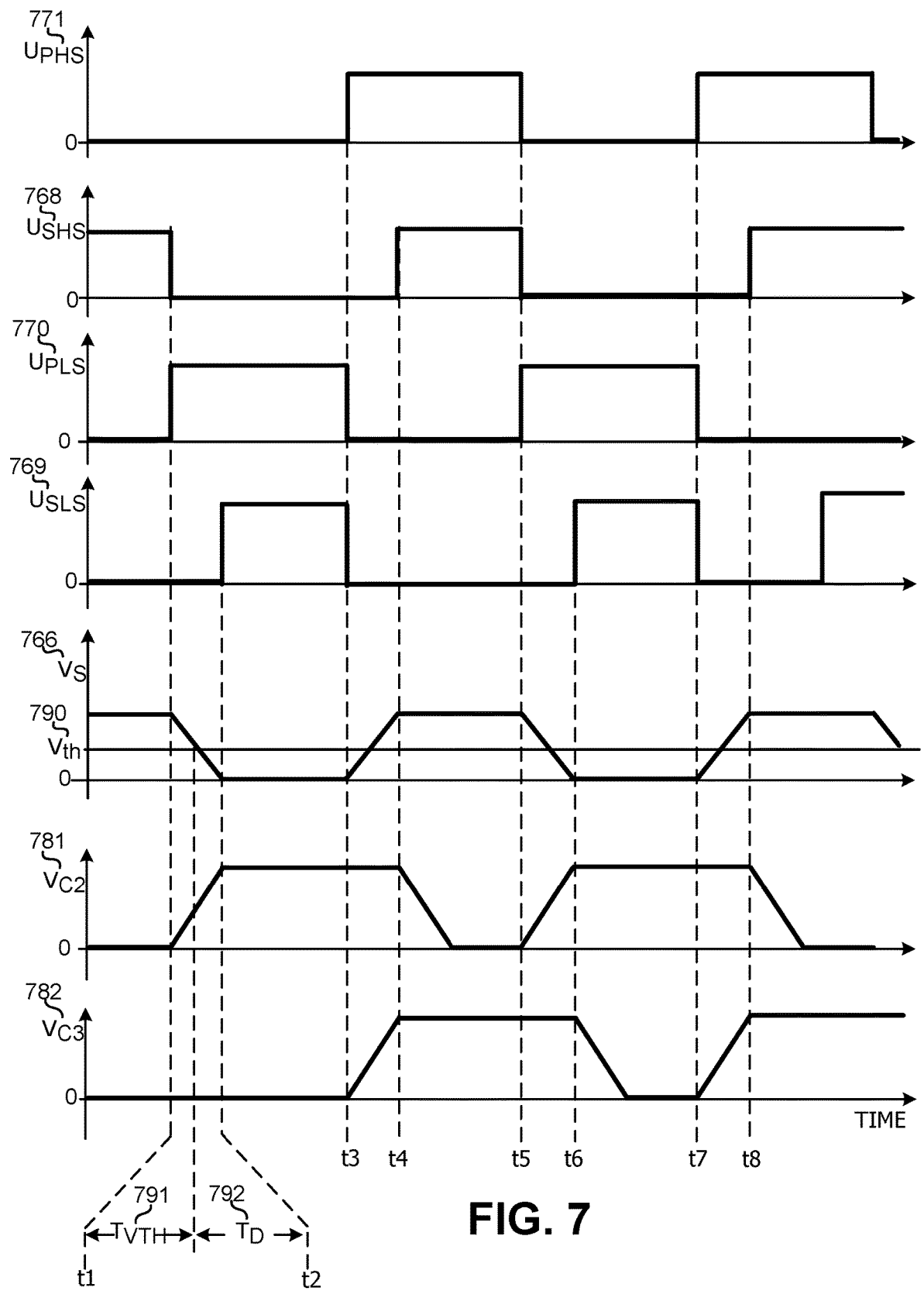
FIG. 7 illustrates an example timing diagram showing signals associated with the pre-set high side signal, the set high side signal, the pre-set low side signal, the set low side signal, the voltage sense signal, the voltage of the second capacitor, and the voltage of the third capacitor, in accordance with the teachings of the present invention.

FIG. 7 shows example timing diagrams in accordance with the teachings of the present invention. For instance, the first timing diagram illustrates the pre-set high side signal $U_{PHS}$ 771. The second timing diagram illustrates the set high side signal $U_{SHS}$ 768. The third timing diagram illustrates the pre-set low side signal $U_{PLS}$ 770. The fourth timing diagram illustrates the set low side signal $U_{S2S}$ 769. The fifth timing diagram illustrates the voltage sense signal $V_S$ 766. The sixth timing diagram illustrates the voltage of the second capacitor $V_{C2}$ 781. The seventh timing diagram illustrates the voltage of the third capacitor $V_{C3}$ 782.

At time t1, the operation to determine when the deadtime of the low side switch begins. The pre-set high signal $U_{PHS}$ 771 remains at logic low. The set high side signal $U_{SHS}$ 768 transitions to a logic low. The pre-set low side signal $U_{PLS}$ 770 transitions to a logic high. The voltage sense signal $V_S$ 766 begins to drop with a negative slope towards zero. The time for the voltage sense signal $V_S$ 766 to cross the voltage threshold VTH 790 is represented as $T_{VTH}$ 791, where the voltage threshold $V_{TH}$ 790 is the voltage threshold reference $V_{TH}$ 690 shown in FIG. 6. The second voltage $V_{C2}$ 781 begins to rise with an upward slope at time t1. The third voltage $V_{C3}$ 782 remains at zero volts.

At time t2, the voltage sense signal $V_S$ 766 has dropped after some delayed time $T_D$ 792. For the sake of brevity, the time $T_{VTH}$ 791 for the voltage sense signal $V_S$ 766 to cross the voltage threshold $V_{TH}$ 790, and delayed time $T_D$ 792 are assumed to be included for both the detecting of the deadtime of the high side switch and low side switch for the rest of the time periods mentioned hereafter. The set low side signal $U_{SLS}$ 769 transitions to a logic high, indicating to the control circuit the low side switch is ready to be turned ON.

At time t3, the operation to determine the when the deadtime of the high side switch begins. The pre-set high side signal $U_{PHS}$ 771 transitions to a logic high. The pre-set low side signal $U_{PLS}$ 770 transitions to a logic low. The voltage sense signal $V_S$ 766 begins to rise in an upward slope. The second voltage $V_{C2}$ 781 remains at a same value. The third voltage $V_{C3}$ 782 begins to rise in an upward slope. At time t4, the voltage sense signal $V_S$ 766 is at a peak point. The second voltage $V_{C2}$ 781 is equal to the third voltage $V_{C3}$ 783. The set high signal $U_{SHS}$ 768 transitions to a logic high.

At time t5, the adaptive deadtime circuit determines when the deadtime of the low side switch begins. The pre-set high signal $U_{PHS}$ 771 transitions to a logic low. The set high side signal $U_{SHS}$ 768 transitions to a logic low. The pre-set low side signal $U_{PLS}$ 770 transitions to a logic high. The voltage sense signal $V_S$ 766 begins to drop with a negative slope to zero. The second voltage $V_{C2}$ 781 begins to rise with an upward slope. The third voltage $V_{C3}$ 782 remains at a same value.

At time t6, the voltage sense signal $V_S$ 766 has dropped to zero volts. The set low side signal $U_{SLS}$ 769 transitions to a logic high, indicating to the control circuit the low side switch is ready to enter the deadtime.

At time t7, the operation to determine the when the deadtime of the high side switch begins. The pre-set high side signal $U_{PHS}$ 771 transitions to a logic high. The pre-set low side signal $U_{PLS}$ 770 transitions to a logic low. The voltage sense signal $V_S$ 766 begins to rise in an upward slope. The second voltage $V_{C2}$ 781 remains at a same value. The third voltage $V_{C3}$ 782 begins to rise in an upward slope. At time t8, the voltage sense signal $V_S$ 766 is at a peak value. The second voltage $V_{C2}$ 781 is equal to the third voltage $V_{C3}$ 783. The set high signal $U_{SHS}$ 768 transitions to a logic high.

Figure 8:
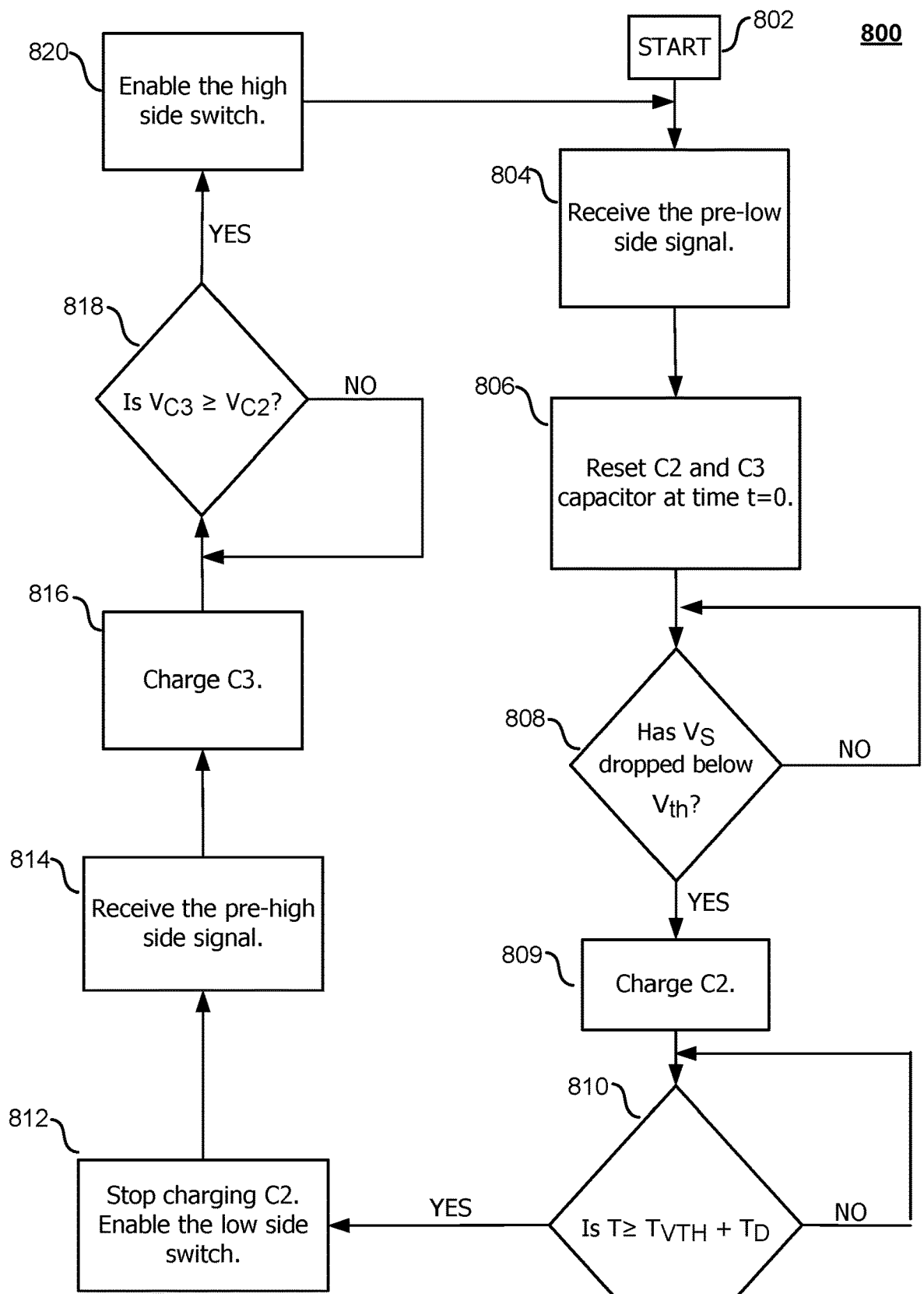
FIG. 8 is a flow chart illustrating an example process of adjusting a deadtime, in accordance with the teachings of the present invention.

FIG. 8 is a flow chart illustrating an example process 800 of adjusting a deadtime, in accordance with the teachings of the present invention. Process 800 begins at the START block 802. Process 800 then proceeds to process block 804. At process block 804, the adaptive deadtime circuit receives the pre-set low side signal. Process 800 proceeds to decision block 806. At process block 806, the second capacitor and third capacitor are completely discharged at time t0. Process 800 proceeds to decision block 808. At decision block 808, the adaptive deadtime circuit determines if voltage sense signal has dropped below a voltage threshold. If the condition is true, process 800 proceeds to process block 809. If the condition is not true, process 800 loops back to decision block 808. At process block 809, the second capacitor C2 begins to charge. Process 800 proceeds to decision block 810. At decision block 810, the adaptive deadtime circuit determines if the charging time of the second capacitor C2 greater than or equal to the time for the voltage sense signal to reach the voltage threshold plus some additional delay. If the condition is true, process 800 proceeds to process block 812. If the condition is not true, process 800 loops back to decision block 810. At process block 812, the charging of the second capacitor is stopped, and the low side switch is enabled. Process 800 proceeds to process block 814. At process block 814, the adaptive deadtime circuit receives the pre-set high side signal. Process 800 proceeds to process block 816. At process block 816, the third capacitor of the adaptive deadtime circuit begins to charge. Process 800 proceeds to decision block 818. At decision block 818, the comparator of the adaptive deadtime circuit determines if the voltage of the third capacitor is greater than or equal to the voltage of the second capacitor. If the condition is not true, process 800 loops back to decision block 818. If the condition is true, process 800 proceeds to process block 820. At process block 820, the high side switch is enabled. Process 800 proceeds back to process block 804.

Figure 9:
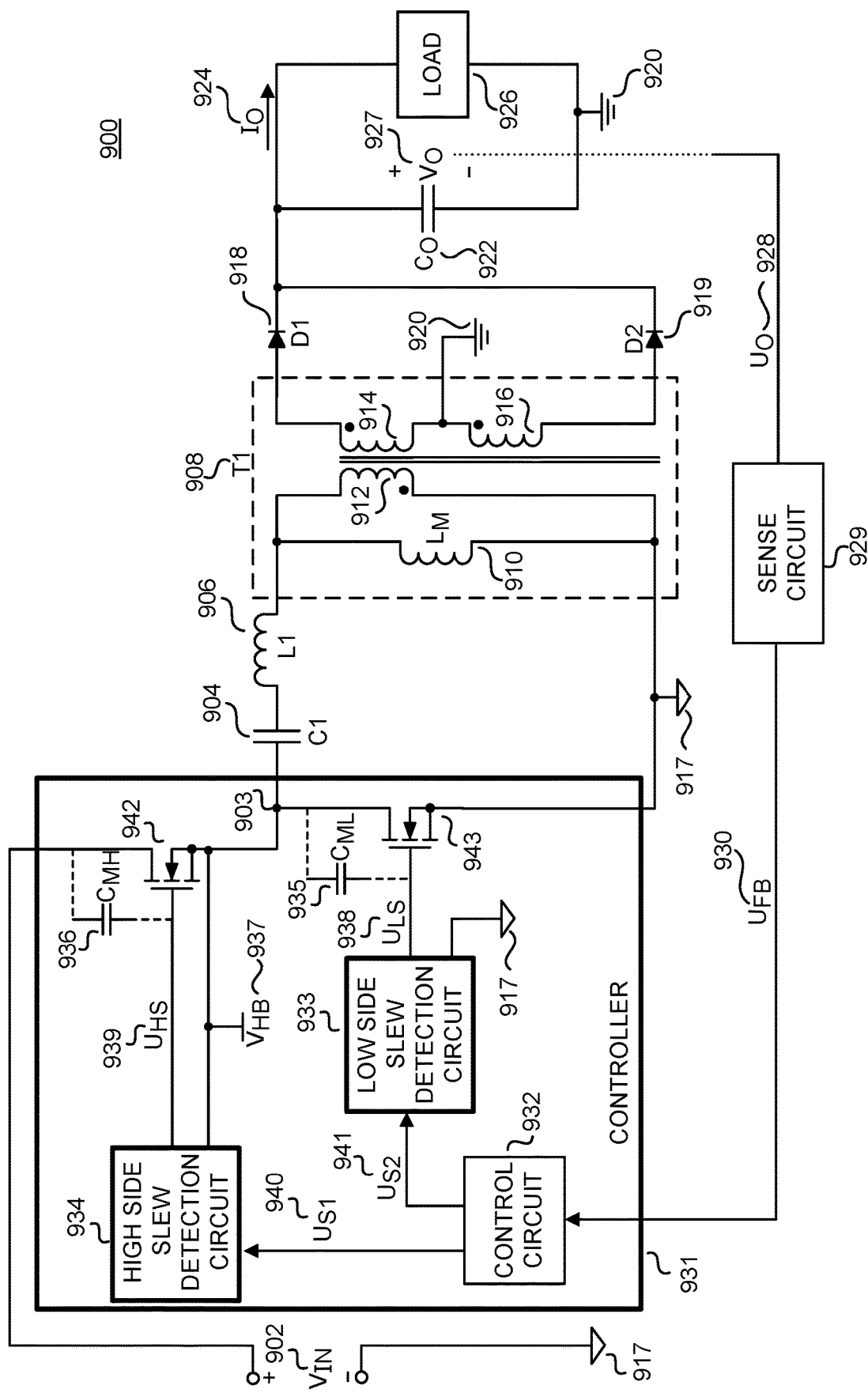
FIG. 9 is a block diagram schematic of one example of a half bridge LLC power converter that includes a controller and a high side slew detection circuit and a low side slew detection circuit, in accordance with the teachings of the present invention.

FIG. 9 is a block diagram schematic of a half bridge LLC power converter that includes a controller and a high side slew detection circuit and a low side slew detection, in accordance with the teachings of the present invention. In one example, the high side slew detection circuit and low side slew detection circuit can include similar circuitry. However, the high side slew detection circuit can be referenced with respect to a half bridge voltage, while the low side slew detection circuit can be referenced to the input return. The example power converter 900 is illustrated including an input voltage $V_{IN}$ 902, a controller 931, a first capacitor C1 904, a first inductor L1 906, an energy transfer element T1 908, an input return 917, a first rectifier D1 918, a second rectifier D2 919, an output return 920, an output capacitor $C_O$ 922, a load 926, and a sense circuit 939.

Energy transfer element T1 908 further includes a magnetizing inductor $L_M$ 910, an input winding 912, a first output winding 914, and a second output winding 916. In some examples, the capacitance of first capacitor C1 904 and the inductance of inductor L1 906 are embedded properties of the energy transfer element T1 908 such that the capacitor C1 904 and inductor L1 906 are not discrete physical components.

The controller 931 further includes a control circuit 932, a low side slew detection circuit 933, a high side slew detection circuit 934, a high side switch 942, and a low side switch 943. The low side slew detection circuit 933 is referenced to input return 917, and the high side slew detection circuit 934 is referenced to the half bridge voltage $V_{HB}$ 937. The high side switch 942 is coupled to receive a high side signal $U_{HS}$ 939 from the high side slew detection circuit 934 and the low side switch 943 is coupled to receive a low side signal $U_{LS}$ 938 from low side slew detection circuit 933. FIG. 9 further illustrates a high side control signal $U_{S1}$ 940, a low side control signal $U_{S2}$ 941, and a half bridge voltage $V_{HB}$ 937 at half bridge node 903.

The example switched mode power converter 900 illustrated in FIG. 9 is coupled in a half bridge LLC configuration, which is just one example of a switched mode power converter that may benefit from the teachings of the present invention. It is appreciated that other known topologies and configurations of switched mode power converters may also benefit from the teachings of the present invention.

The power converter 900 provides output power to the load 926 from an input voltage $V_{IN}$ 902. In one example, the input voltage $V_{IN}$ 902 is a rectified input voltage from an ac voltage source. The high side switch 942 is coupled to receive the input voltage $V_{IN}$ 902 from a first end of high side switch 942. In one example, the high side switch is a metal oxide semiconductor field effect transistor (MOSFET) including a body diode. The second end of high side switch 942 is coupled to a first end of the low side switch 943 by half bridge node 903. In one example, the low side switch is a metal oxide semiconductor field effect transistor (MOSFET) including a body diode. The high side switch 942 can have an intrinsic drain to gate capacitance illustrated by capacitor $C_{MH}$ 936, while the low side switch 943 can have an intrinsic gate to drain capacitance illustrated by capacitor CML 935. The second end of low side switch 943 is further coupled to the input return 917. The first capacitor C1 904 is coupled to a first inductor L1 906 and may function together as a tank circuit. Energy is transferred from the input winding 912 to the output windings 914 and 916. First output winding 914 is coupled to a first rectifier D1 918. In one example, the first rectifier D1 918 is a diode. However, in some embodiments, the first rectifier D1 918 may be a transistor used as a synchronous rectifier. Energy is transferred and rectified by first rectifier D1 918 when the high side switch 942 is turned ON and the low side switch 943 is OFF.

The second output winding 916 is coupled to second rectifier D2 919. In one example, the second rectifier D2 919 is a diode. However, in some embodiments, the second rectifier D2 919 may be a transistor used as a synchronous rectifier. Energy is transferred and rectified by rectifier D2 919 when the high side switch 942 is turned OFF and the low side switch 943 is ON. The output capacitor $C_O$ 922 and load 926 are coupled to the first rectifier D1 918 and second rectifier D2 919. An output is provided to the load 926 and may be provided as either an output voltage $V_O$ 927, an output current $I_O$ 924, or a combination of the two.

The power converter 900 further comprises circuitry to regulate the output, which is exemplified as output quantity $U_O$ 928. In general, the output quantity $U_O$ 928 is either an output voltage $V_O$ 927, an output current $I_O$ 924, or a combination of the two. A sense circuit 929 is coupled to sense the output quantity $U_O$ 928 and to provide a feedback signal $U_{FB}$ 930, which is representative of the output quantity $U_O$ 928. Feedback signal $U_{FB}$ 930 may be a voltage signal or a current signal.

In one example, there may be a galvanic isolation (not shown) between the controller 931 and the sense circuit 929. The galvanic isolation could be implemented by using devices such as an opto-coupler, a capacitor or a magnetic coupling. In a further example, the sense circuit 929 may utilize a voltage divider to sense the output quantity $U_O$ 928 from the output of the power converter 900.

The high side slew detection circuit 934 determines the slewing of voltage at the half bridge node 903, before turning on the high side switch 942 by using the Miller capacitance of the high side switch 942 to sense the slewing, illustrated by capacitance $C_{MH}$ 936.

During a half bridge slew to the input voltage, the capacitance of the drain gate of the high side switch 942 discharges into the drain of the high side switch, sourcing current from the gate driver. The high side slew detection circuit 934 is coupled to provide the capacitance of the drain gate discharge current from a local bypass supply (not shown), in order to supply the drain gate discharge current while holding the high side switch 942 OFF. When the discharge is completed, this indicates the half bridge node 903 is no longer slewing, and it is time to turn on the high side switch 942.

The low side slew detection circuit 933 determines the slewing of voltage at the half bridge node 903 before turning on the low side switch 943 by using the Miller capacitance of the low side switch 943 to sense the slewing illustrated by capacitance CML 935.

During a half bridge slew to the input return 943, the capacitance of the drain gate of the low side switch 943 discharges into the drain of the low side switch, sourcing current from the gate driver. The low side slew detection circuit 933 is coupled to provide the capacitance of the drain gate discharge current from a local bypass supply (not shown), in order to supply the drain gate discharge current while holding the low side switch 943 off. When the discharge is completed, this indicates half bridge voltage $V_{HB}$ 937 is at the same potential as the half bridge node 903 as the input return 917, and it is time to turn on the low side switch 943. In another examples, the half bridge voltage can be close to the same potential or reach a minimum, such that it gets to a minimum and flattens out or starts rising again and switch at that point.

Further details to adjust the deadtime of the low side switch will be discussed in FIG. 10.

Figure 10:
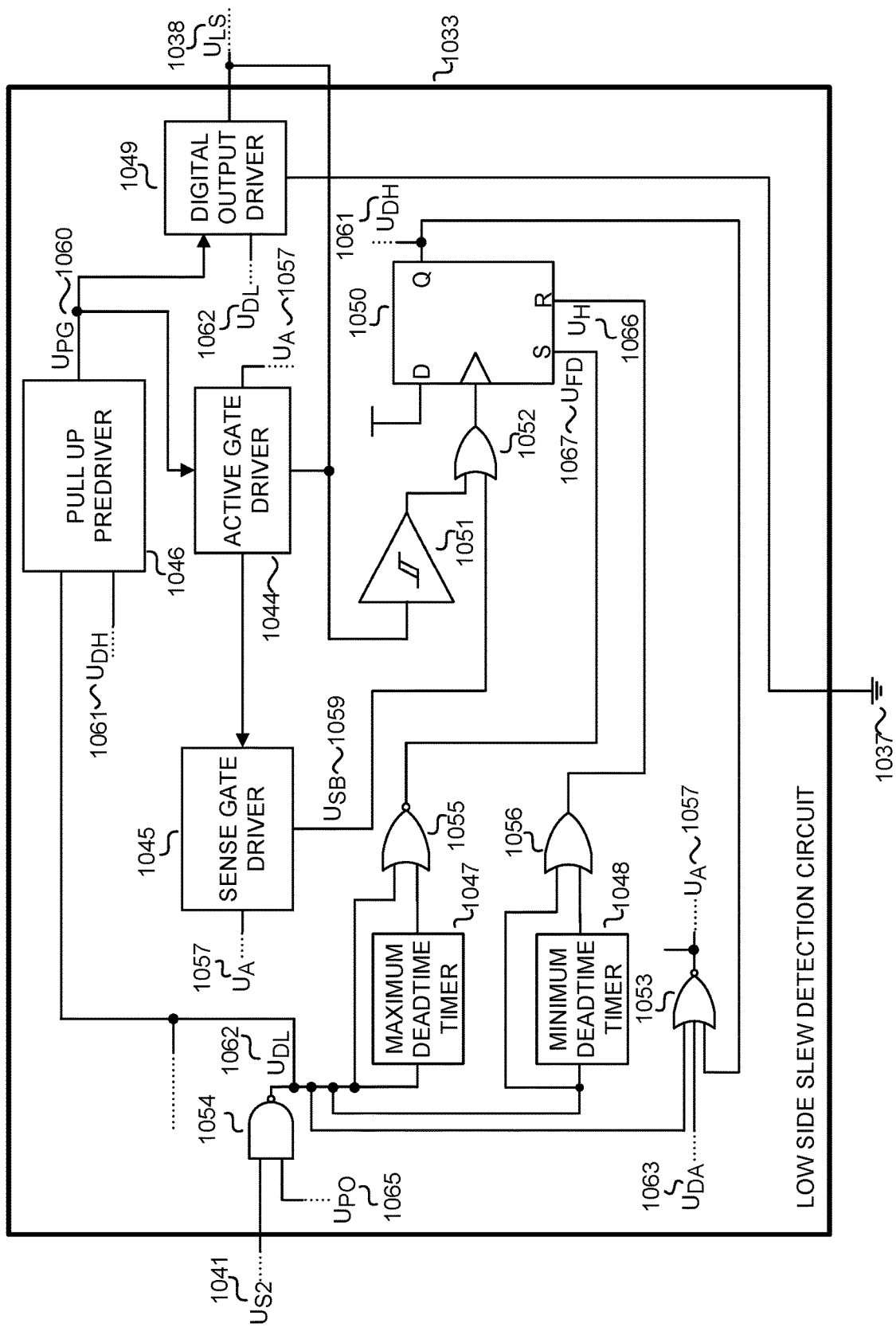
FIG. 10 is a block diagram of an example low side slew detection circuit, in accordance with the teachings of the present invention.

FIG. 10 is a block diagram of the low side slew detection circuit, in accordance with the teachings of the present invention. It is appreciated that similar circuit and elements would be included for the high side slew detection circuit as described in FIG. 9.

The low side slew detection circuit 1033 includes an active gate driver 1044, a sense gate driver 1045, a pull up predriver 1046, a maximum deadtime timer 1047, a minimum deadtime timer 1048, and a digital output driver 1049. FIG. 10 further includes a flip flop 1050, a Schmitt trigger 1051, logic gates 1052, 1053, 1054, 1055, 1056, an active mode signal UA 1057, sense gate signal driver signal $U_{SB}$ 1059, a low side drive signal $U_{LS}$ 1038, a pull up gate driver signal $U_{PG}$ 1060, a drive high signal $U_{DH}$ 1061, a drive low signal $U_{DL}$ 1062, a disable active signal $U_{DA}$ 1063, a low side control signal $U_{S2}$ 1041, a power on signal $U_{PO}$ 1065, a hold signal $U_H$ 1066, and a force drive high signal $U_{FD}$ 1067.

The low side slew detection circuit 1033 operates in four operating modes. The first operating mode occurs when the low side switch is off, the high side switch is on, and the half bridge voltage is at the input voltage. The current of the power converter is flowing through the high side switch. In the first operating mode, the high side control signal $U_{S1}$ (not shown) is driven high and the low side control signal $U_{S2}$ 1041 is driven low. In one example, the high side control signal $U_{S1}$ and low side control signal $U_{S2}$ 1041 can be generated by an internal voltage controlled oscillator (VCO) from the control circuit that generates the power converter operating frequency. The operating frequency can adjust as necessary to regulate the output voltage. During the first operating mode, the drive low signal $U_{DL}$ 1062 is a logic high. The output of logic gate 1054 is coupled to an input of logic gate 1055, the maximum deadtime timer 1047, and the minimum deadtime timer 1048. In one example, the logic gate 1055 is a NOR gate. The output of the maximum deadtime timer 1047 is coupled to a second input of the logic gate 1055. The output of logic gate 1055 generates a force drive signal $U_{FD}$ 1067 that is coupled to the set terminal of flip flop 1050.

The output of the minimum deadtime timer 1048 is coupled to an input of logic gate 1056. In one example, logic gate 1056 is an OR gate. The output of logic gate 1056 generates a hold signal $U_H$ 1066 that is coupled to the reset terminal of flip flop 1050. The output of flip flop 1050 generates a drive high signal $U_{DH}$ 1061 that is coupled to an input of logic gate 1053. In one example, logic gate 1053 is a NOR gate. The active mode signal UA 1057 determines if the active gate driver 1044 and the sense gate driver 1045 circuits are enabled. In the first operating mode, the active mode signal $U_A$ 1057 is logic low, therefore the active gate driver 1044 and the sense gate driver 1045 are powered down.

The second operating mode begins when the high side control signal $U_{S1}$ (not shown) is driven from high to low and low side control signal $U_{S2}$ 1041 is driven from low to high. In the second operating mode, the low side slew detection circuit 1033 operates in an initialization and hold mode when the low side switch is OFF, the high side switch is OFF, and the half bridge voltage is at the input voltage. The drive low signal $U_{DL}$ 1062 is logic low and is coupled to an input of logic gate 1053. The output of logic gate 1053 generates a logic high for the active mode signal $U_A$ 1057. The active gate driver 1044 and sense gate driver 1045 are activated in response to the active mode signal $U_A$ 1057.

In the third operating mode, the low side slew detection circuit 1033 operates in a sense and wait mode where the low side switch is ON, the high side switch is OFF, and the half bridge voltage is falling. The low slew detection circuit 1033 determines when the slew event of the half bridge voltage falling is concluded.

The minimum deadtime timer 1048 begins in response to the drive low signal $U_{DL}$ 1062. The active gate driver 1044 biases the pull up gate signal $U_{PG}$ 1060 to the digital output driver 1049 to supply a drain gate discharge current. The voltage at the half bridge node continues to rise and high side switch conducts through its body diode. The end of the slew event occurs when the voltage at the half bridge node is at or near the input return. The sense gate driver 1045 determines the end of slewing when the pull up gate driver signal $U_{PG}$ 1060 is falling and outputs a sense gate driver signal $U_{SB}$ 1059. Logic gate 1052 is coupled to receive the sense gate driver signal $U_{SB}$ 1059 at one of the inputs, and output a clock signal to flip flop 1050. In one example, logic gate 1052 is an OR gate.

The pull up predriver circuit 1046 is coupled to receive a drive low signal $U_{DL}$ 1062 and a drive high signal $U_{DH}$ 1061. The pull up predriver circuit 1046 is coupled to generate a pull up gate signal $U_{PG}$ 1060. The active gate driver 1044 is driving the high side signal $U_{HS}$ 1139 low. The sense gate driver 1045 is detecting slewing by monitoring the driver output current, which is represented by the pull gate driver signal $U_{PG}$ 1060.

In the fourth operating mode, the low side switch is on, the high side switch is off, and the voltage at the half bridge node is at or near the input return. The active gate driver 1044 and sense gate driver 1045 are disabled by the active mode signal $U_A$ 1057.

Figure 11:
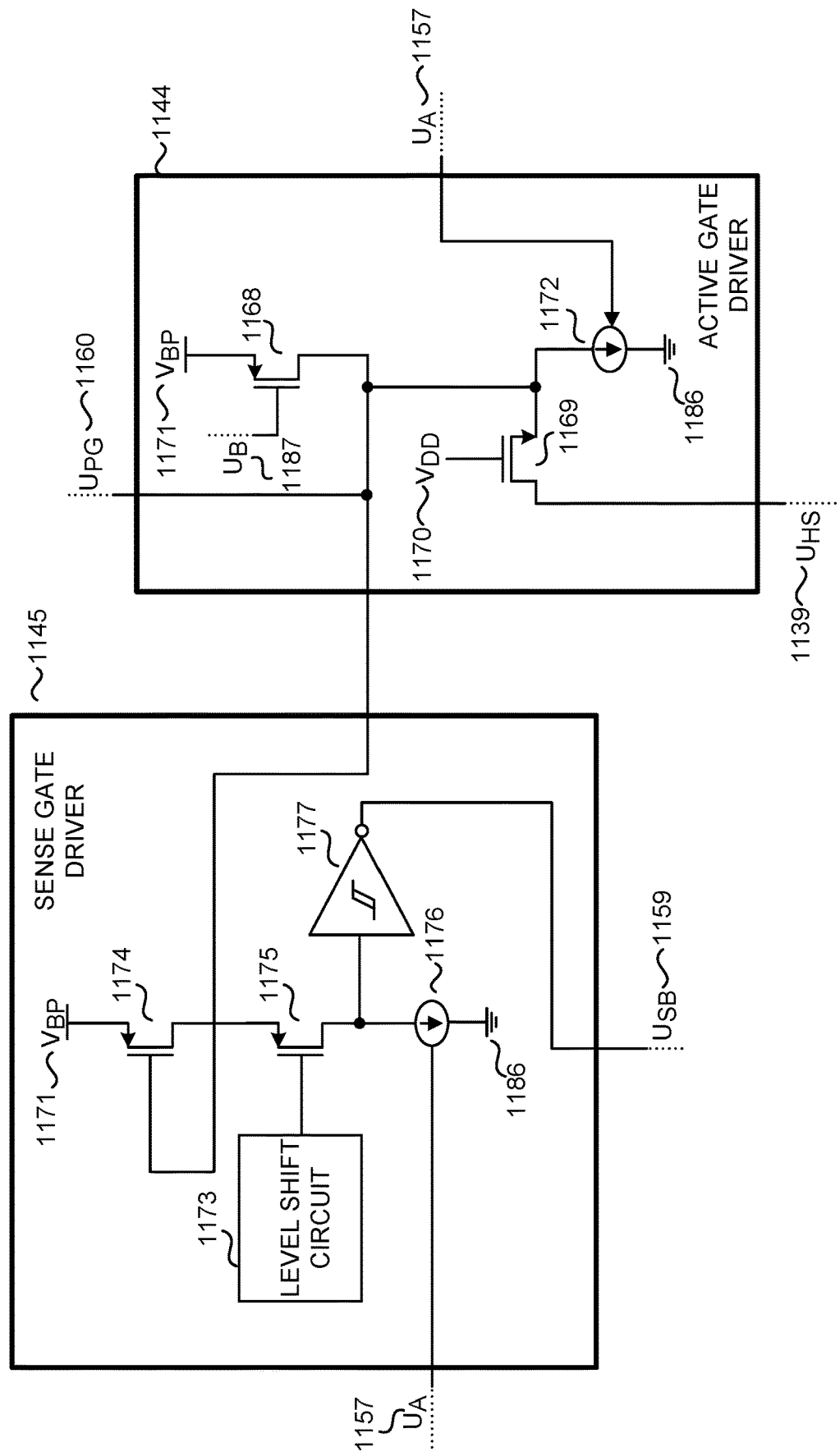
FIG. 11 is a block diagram of an example active gate driver and the sense gate driver, in accordance with the teachings of the present invention.

FIG. 11 is a block diagram of the active gate driver and the sense gate driver, in accordance with the teachings of the present invention. The active gate driver 1144 is coupled to receive the active mode signal $U_A$ 1157, the pull up gate signal $U_{PG}$ 1160, and the high side drive signal $U_{HS}$ 1139. The active gate driver 1144 includes transistors 1168, 1169, and a current source 1172.

The sense gate driver 1145 is coupled to receive the active mode signal $U_A$ 1157, the pull up gate signal $U_{PG}$ 1160, and output a sense gate signal driver signal $U_{SB}$ 1159. The sense gate driver 1145 includes a level shift circuit 1173 transistors 1174, 1175, a current source 1176, and an inverted Schmitt trigger 1177.

The active gate driver 1144 and sense gate driver 1145 are coupled to be activated in response to the active mode signal $U_A$ 1157 in the second and third operating modes as mentioned previously. The active mode signal $U_A$ 1157 is coupled to current source 1172, which is further coupled to a local return 1186. In one example, the active gate driver 1144 provides negative feedback of the high side signal $U_{HS}$ 1139 with transistor 1169. As the drain gate discharge current rises, the digital output driver can source too much current into the high side drive signal $U_{HS}$ 1139, which causes the voltage of the high side drive signal $U_{HS}$ 1139 to rise. As the voltage of the high side signal $U_{HS}$ 1139 rises, more current is sourced from the gate into the current source 1172, which raises the voltage of the pull up gate signal $U_{PG}$ 1160.

Figure 12:
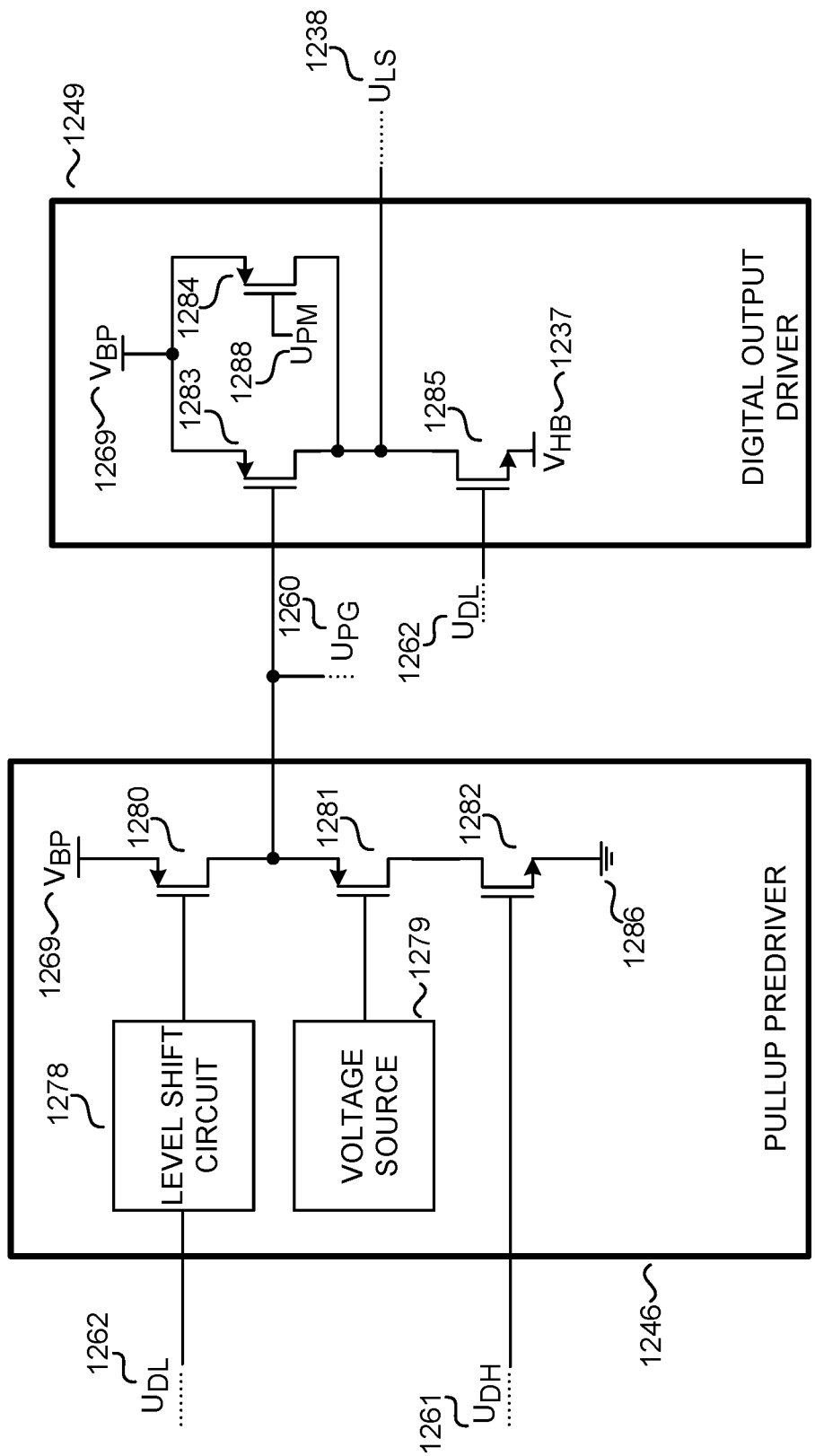
FIG. 12 is a block diagram of an example signal amplification stage and the digital output driver, in accordance with the teachings of the present invention.

FIG. 12 is a block diagram of the pull up predriver circuit and the digital output driver, in accordance with the teachings of the present invention. The pull up predriver circuit 1246 is coupled to receive the drive high signal $U_{DH}$ 1261, drive low signal $U_{DH}$ 1262, and generate a pull up gate signal $U_{PG}$ 1260. The pull up predriver circuit 1246 includes a level shift circuit 1278, a voltage source 1279, and transistors 1280, 1281, 1282. The level shifter 1278 ensures the gate voltage on transistor 1280 does not exceed 5 volts. Furthermore, the level shifter 1278 keeps the high side switch off during power up and under voltage level detection.

The digital output driver 1249 is coupled to receive a pull up gate signal $U_{PG}$ 1260, and output a low side drive signal ULs 1238. The digital output driver 1249 includes transistors 1283, 1284, 1285. The drain of transistor 1283 is coupled to the drain of transistor 1285. The gate of transistor 1284 is coupled to a pull gate max signal $U_{PM}$ 1288. The source of transistor 1285 is coupled to the half bridge voltage $V_{HB}$ 1237.

Figure 13:
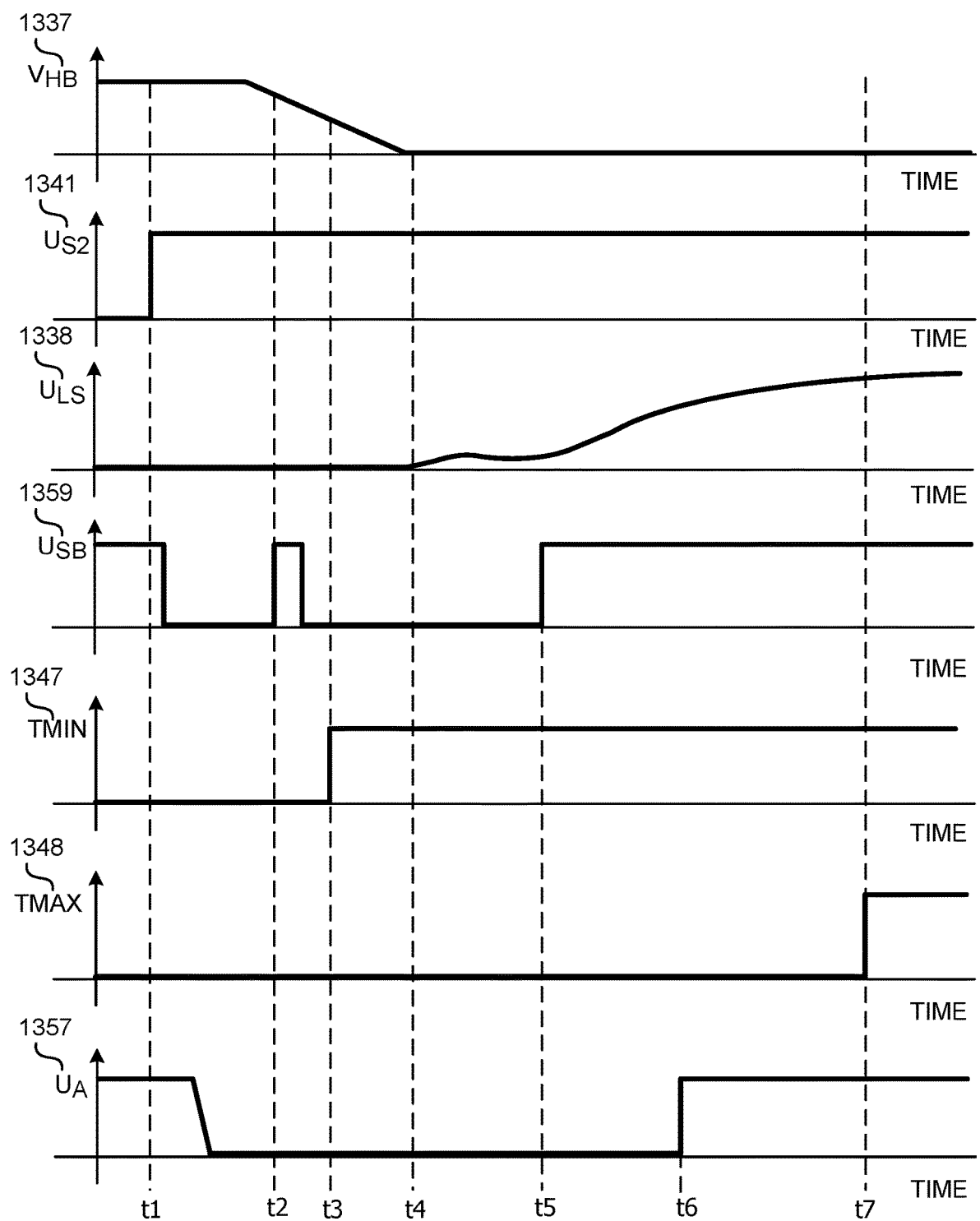
FIG. 13 illustrates an example timing diagram showing signals associated with the half bridge voltage, the high side control signal, the high side gate signal, sense gate signal driver signal, a minimum time signal, a maximum time signal, and an active signal, in accordance with the teachings of the present invention.

FIG. 13 illustrates an example timing diagram showing signals associated with the half bridge voltage, the high side control signal, the high side gate signal, sense gate signal driver signal, a minimum time signal, a maximum time signal, and an active signal, in accordance with the teachings of the present invention. In this example, the operation of low side slew detection circuit of FIG. 9 is demonstrated, similar operation is needed for the high side slew detection as well. As shown, the topmost waveform is the half bridge voltage $V_{HB}$ 1337. The second timing diagram illustrates the low side control signal $U_{S2}$ 1341. The third timing diagram illustrates the low side drive signal $U_{HS}$ 1338. The fourth timing diagram illustrates the sense gate drive signal 1059. The fifth timing diagram illustrates the minimum deadtime timer. The sixth timing diagram illustrates the maximum deadtime timer. The seventh timing diagram illustrates the active mode signal.

In operation, at time t1, the half bridge voltage $V_{HB}$ is 1337 is at the input voltage because the high side switch is on and the low side is off. The high side control signal $U_{S1}$ (not shown) transitions to logic low to turn off the high side switch (not shown). Almost simultaneously, the low side switch control signal $U_{S2}$ 1341 transitions from logic low to logic high in preparation for turning on the low side switch. After time t1, the sense gate driver signal $U_{SB}$ 1059 transitions a logic low, which represents there is no slewing of the half bridge voltage $V_{HB}$ 1337. The active signal $U_A$ 1357 is an active low signal that represents the circuitry of the low side slew detection circuit is actively sensing for a slewing of the half bridge voltage $V_{HB}$ 1337. Turning off the high side switch can cause the half bridge voltage $V_{HB}$ 1337 to begin start slewing from high to low (under the influence of current flowing in the resonant inductance) prior to time t2. The sense gate driver signal $U_{SB}$ 1059 may momentarily transition to a logic high after low side control signal $U_{S2}$ 1341 goes high and the sense gate driver signal $U_{SB}$ 1059 initially goes low before stabilization of the active sensing to falsely detect an end of slewing of the half bridge voltage $V_{HB}$ 1337, but this is recognized as a false detection because the minimum deadtime timer has not transitioned to a logic high. At time t3, the minimum deadtime timer transitions to a logic high. At time t4, the half bridge voltage $V_{HB}$ 1337 is at the reference voltage and ceases slewing downwards. At time t5, the sense gate drive signal transitions to a logic high that represents the end of a slew event, and the low side drive signal $U_{LS}$ 1338 begins to rise to turn on the low side switch. At time t6, the active signal $U_A$ 1357 transitions to a logic high which turns on the low side switch hard. At time t7, the maximum deadtime timer 1348 transitions to a logic high which would force the low side switch to turn on if it had not been executed already.

Figure 14:
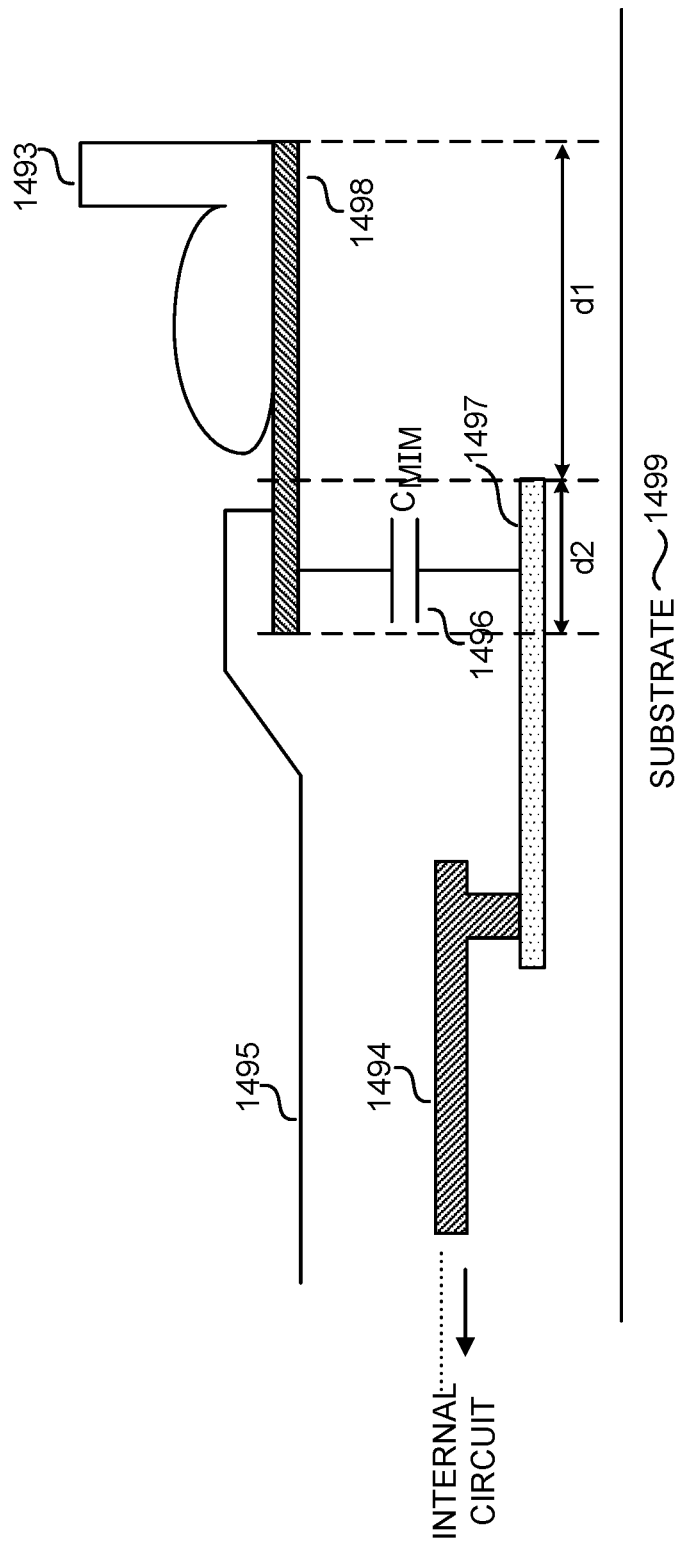
FIG. 14 is a cross sectional view of an example metal insulator metal capacitor for detecting the voltage of a half bridge node, in accordance with the teachings of the present invention.

FIG. 14 is a cross sectional view of a metal insulator metal capacitor for detecting the voltage of a half bridge node, in accordance with the teachings of the present invention. The structure of this metal insulator metal (MIM) capacitor provides a reliable way to obtain the slew rate (dv/dt) of a node, and can be used by the control circuit of a controller to detect the voltage of the half bridge, such as for example the controllers of the examples discussed above in FIGS. 1-13. In one example, the node is a half bridge node which can swing from 0 to 400 volts. A direct connection of a high voltage node can damage an integrated circuit. By having the structure of a MIM capacitor 1496, as shown for instance in FIG. 14, a small current is generated from the MIM capacitor 1496 that represents the rate of change in voltage of the node (i.e., dv/dt), which may be detected by an example controller coupled to obtain the slew rate of the half bridge node in accordance with the teachings of the present invention.

To illustrate, the structure illustrated in FIG. 14 includes a bond 1493 coupled to a bond pad 1498, such as for example a bond pad metal, which are formed over a dielectric 1495 that is disposed over a substrate 1499. A polysilicon layer 1497 is disposed in dielectric 1495. As shown in the depicted example, bond pad 1498 partially overlaps polysilicon layer 1497 such that a portion of bond pad 1498 is disposed directly over polysilicon layer 1497, with dielectric 1495 is disposed between bond pad 1498 and polysilicon layer 1497. For instance, the length d2 of bond pad 1498 and polysilicon layer 1497 are the portions of bond pad 1498 and polysilicon layer 1497 that are directly overlapped. In contrast, the non-overlapping length d1 of bond pad 1498 is not disposed directly over polysilicon layer 1497, and is instead laterally disposed relative to an edge of polysilicon layer 1497 in accordance with the teachings of the present invention. The MIM capacitor 1496 is provided within the d2 length overlapping portion of bond pad 1498 forming the top "plate" of MIM capacitor 1496, and the underlying d2 length portion of polysilicon layer 1497 forming the bottom "plate" of MIM capacitor 1496. A high voltage node, such as for example a half bridge node as discussed above in FIGS. 1-3, is coupled to the bond pad 1498 through bond 1493. One end of an interconnect 1494 disposed in dielectric 1495 is coupled to the polysilicon layer 1497, and the other end of interconnect 1494 may be coupled to an internal circuit, such as for example a controller as discussed above in FIGS. 1-3 to sense the rate of change of voltage (i.e., dv/dt) of a high voltage node (e.g., a half bridge node) coupled to bond pad 1498.

It is appreciated that with the underlying bottom plate of the MIM capacitor 1496 provided with d2 portion of polysilicon layer 1497 as shown, instead of being completely overlapped by bond pad 1498, high mechanical stress placed on the dielectric 1495 by bond pad 1498 is reduced since there is no underlying polysilicon layer 1497 in the d1 portion of bond pad 1498. This reduction of mechanical stress to dielectric 1395 reduces damage to the dielectric 1495, which reduces unwanted conduction between the top and bottom plates formed with bond pad 1498 and polysilicon layer 1497. In addition, by forming MIM capacitor 1496 with the partially overlapping bond pad 1498 and polysilicon layer 1497, little additional area is required to provide MIM capacitor 1496 in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

Example 1

A controller for use in a power converter, comprising: first and second half bridge sense circuits coupled to a half bridge node of the power converter, wherein the half bridge node is coupled between a high side switch and a low side switch coupled to an input of the power converter; a rising slew detection circuit coupled to the first half bridge sense circuit to output a first slew detection signal in response to a rising slew event at the half bridge node; a falling slew detection circuit coupled to the second half bridge sense circuit to output a second slew detection signal in response to a falling slew event at the half bridge node; a control circuit coupled to output a high side drive signal to the high side switch and a low side drive signal to the low side switch in response to a the first slew detection signal, the second slew detection signal, and a feedback signal representative of an output of the power converter to control switching of the high side switch and the low side switch to control a transfer of energy from the input of the power converter to the output of the power converter.

Example 2

The controller of example 1, wherein the rising slew detection circuit comprises: a first threshold current mirror coupled to the first half bridge sense circuit to compare a first current through the first half bridge sense circuit with a first threshold current; a first transistor having a gate coupled to the first threshold current mirror, wherein the first transistor is coupled to be responsive to a first current comparison of the first threshold current mirror; and a first sense current mirror coupled to the first transistor to output the first slew detection signal in response the first current comparison of the first threshold current mirror.

Example 3

The controller of any of the previous examples, wherein the rising slew detection circuit further comprises a first resistor coupled between sources of transistors included in the first threshold current mirror and the first half bridge sense circuit.

Example 4

The controller of any of the previous examples, wherein the falling slew detection circuit comprises: a second threshold current mirror coupled to the second half bridge sense circuit to compare a second current through the second half bridge sense circuit with a second threshold current; a second transistor having a gate coupled to the second threshold current mirror, wherein the second transistor is coupled to be responsive to a second current comparison of the second threshold current mirror; and a second sense current mirror coupled to the second transistor to output the second slew detection signal in response the second current comparison of the second threshold current mirror.

Example 5

The controller of any of the previous examples wherein the falling slew detection circuit further comprises a second resistor coupled between sources of transistors included in the second threshold current mirror and the second half bridge sense circuit.

Example 6

The controller supply of any of the previous examples, wherein each one of the first and second half bridge sense circuits comprises a capacitor coupled to the half bridge node to output a respective current in response to a rate of change of voltage at the half bridge node.

Example 7

The controller of any of the previous examples, wherein each one of the first and second half bridge sense circuits comprises: a dielectric material disposed over a semiconductor substrate; a polysilicon layer disposed in the dielectric material; a bond pad separated from and disposed partially over the polysilicon layer in the dielectric material, wherein the capacitor is defined in an overlapping portion of the polysilicon layer and the bond pad including the dielectric material between the overlapping portion of the polysilicon layer and the bond pad; a bond coupled to the bond pad in a non-overlapping portion of the bond pad and the poly silicon layer, wherein the bond is coupled to the half bridge node; and an interconnect coupled to the polysilicon layer to output the respective current in response to the rate of change of voltage at the half bridge node.

Example 8

The controller of any of the previous examples, wherein the control circuit is further coupled to adjust a deadtime of the high side switch and the low side switch in response to the first slew detection signal and the second slew detection signal.

Example 9

A controller for use in a power converter, comprising: a control circuit coupled to output a pre-set high side signal and a pre-set low side signal in response to a feedback signal representative of an output of the power converter, wherein the control circuit is further coupled to output a high side drive signal to a high side switch in response to a set high side signal, and wherein the control circuit is further coupled to output a low side drive signal to a low side switch in response to a set low side signal to control switching of the high side switch and the low side switch to control a transfer of energy from the input of the power converter to the output of the power converter; and an adaptive deadtime circuit coupled to receive the pre-set high side signal and the pre-set low side signal from the control circuit, wherein the adaptive deadtime circuit is further coupled to receive a voltage sense signal from a threshold detection circuit coupled to a half bridge node of the power converter, wherein the half bridge node is coupled between a high side switch and a low side switch coupled to an input of the power converter, and wherein the adaptive deadtime circuit is coupled to output the set high side signal and the set low side signal in response to the pre-set high side signal, the pre-set low side signal, and the voltage sense signal.

Example 10

The controller of example 9, wherein the threshold detection circuit comprises a field effect transistor (FET) coupled between the half bridge node and the adaptive deadtime circuit, wherein the threshold detection circuit is coupled to output the voltage sense signal to the adaptive deadtime circuit in response to a voltage at the half bridge node.

Example 11

The controller of any of the previous examples, wherein the threshold detection circuit comprises a junction field effect transistor (JFET) coupled between the half bridge node and the adaptive deadtime circuit, wherein the threshold detection circuit is coupled to output the voltage sense signal to the adaptive deadtime circuit in response to a voltage at the half bridge node.

Example 12

The controller of any of the previous examples, wherein the voltage sense signal is responsive to a difference between a gate to source voltage of the JFET and a pinch off voltage of the JFET.

Example 13

The controller of any of the previous examples, wherein the adaptive deadtime circuit comprises: first and second capacitors that are coupled to be discharged in response to the pre-set low side signal; a delay circuit having an input coupled to receive the voltage sense signal; a first comparator including a first input coupled to receive a delayed voltage sense signal from an output of the delay circuit, wherein the first comparator further includes a second input coupled to a reference voltage, wherein the first capacitor is coupled to be charged in response to an output of the first comparator; a first logic gate having a first input coupled to receive the pre-low side signal, and a second input coupled to the output of the first comparator, wherein the first logic gate is further coupled to output the set low side signal; a second comparator including a first input coupled to the first capacitor, and a second input coupled to the second capacitor, wherein the second capacitor is coupled to be charged in response to an output of the second comparator; and a second logic gate having a first input coupled to receive the pre-high side signal, and a second input coupled to the output of the second comparator, wherein the second logic gate is further coupled to output the set high side signal.

Example 14

The controller of any of the previous examples, wherein the first capacitor is coupled to be charged from a first current source in response to the output of the first comparator, and wherein the second capacitor is coupled to be charged from a second current source in response to the output of the second comparator.

Example 15

The controller of any of the previous examples, wherein the adaptive deadtime circuit coupled is further coupled to output the set high side signal and the set low side signal to adjust a deadtime of the high side switch and the low side switch to allow zero voltage switching (ZVS) operation.

Example 16

A controller for use in a power converter, comprising: a control circuit coupled to a half bridge node of the power converter, wherein the half bridge node is coupled between a high side switch and a low side switch coupled to an input of the power converter, wherein the control circuit is coupled to output a high side control signal and a low side control signal in response to a feedback signal representative of an output of the power converter to control a transfer of energy from the input of the power converter to the output of the power converter; a high side slew detection circuit coupled to receive the high side control signal, wherein the high side slew detection circuit is coupled to the half bridge node and a Miller capacitance of the high side switch, and wherein the high side slew detection circuit is further coupled to output a high side drive signal to the high side switch in response to the high side control signal, the Miller capacitance, and the half bridge node; and a low side slew detection circuit coupled to receive the low side control signal, wherein the low side slew detection circuit is coupled to the half bridge node and a Miller capacitance of the low side switch, and wherein the low side slew detection circuit is further coupled to output a low side drive signal to the low side switch in response to the low side control signal, the Miller capacitance, and the half bridge node.

Example 17

The controller of example 16, wherein the high side slew detection circuit comprises: a first logic gate coupled to output a drive low signal in response to the high side control signal a power on signal; a maximum deadtime timer coupled to receive the drive low signal; a minimum deadtime timer coupled to receive the drive low signal; a second logic gate coupled to output a force drive signal in response to the drive low signal and the maximum deadtime timer; a third logic gate coupled to output a hold signal in response to the drive low signal and the minimum deadtime timer; a fourth logic gate coupled to output an active mode signal in response to the drive low signal, a disable active signal, and a drive high signal; a pull up predriver coupled to output a pull up gate driver signal in response to the drive low signal and the drive high signal; a digital output driver coupled to output the high side signal in response to the pull up gate driver signal and the drive low signal; an active gate driver coupled to receive the pull up gate driver signal, the active mode signal, and the high side signal; a sense gate driver coupled to output a sense gate driver signal in response to the active gate driver and the active mode signal; a first Schmitt trigger coupled to receive the high side signal; a fifth logic gate coupled to output a clock signal in response to the first Schmitt trigger and the sense gate driver signal; and a flip flop coupled to output the drive high signal, wherein the flip flop is coupled to be clocked in response to the clock signal, wherein the flip flop is coupled to be set in response to the force drive high signal, and wherein the flip flop is coupled to be reset in response to the hold signal.

Example 18

The controller of example 17, wherein the active gate driver comprises: a first transistor having a drain coupled to the pull up gate signal; a first current source coupled to the first transistor and the first active signal; and a second transistor having a source coupled to the first current source and the drain of the first transistor, wherein a drain of the second transistor is coupled to the high side signal.

Example 19

The controller of any of the previous examples, a third transistor having a gate coupled to the drain of the first transistor; a fourth transistor having a source coupled to a drain of the third transistor; a level shift circuit coupled to a gate of the fourth transistor; a second current source coupled to a drain of the fourth transistor, and coupled to the active mode signal; and a second Schmitt trigger coupled to output the sense gate driver signal in response to the drain of the fourth transistor.

Example 20

The controller of any of the previous examples, wherein the digital output driver comprises: a fifth transistor having a gate coupled to the pull up gate driver signal; a sixth transistor having a gate coupled to a pull gate max signal, and a drain coupled to a drain of the fifth transistor; and a seventh transistor having a gate coupled to the drive low signal, a source coupled to the half bridge node, and a drain coupled the drains of the fifth and sixth transistors, wherein the high side signal is output at the drains of the fifth, sixth, and seventh transistors.

Example 21

The controller of any of the previous examples: wherein the pull up predriver comprises: a level shift circuit coupled to receive the drive low signal; an eighth transistor having a gate coupled to the level shift circuit; a ninth transistor having a source coupled to a drain of the eighth transistor and the pull up gate driver signal, wherein a gate of the ninth transistor is coupled to a voltage source; and a tenth transistor having a drain coupled to a drain of the ninth transistor, and a gate coupled to the drive high signal.

What is claimed is:

1. A controller for use in a power converter, comprising:
a control circuit coupled to output a pre-set high side signal and a pre-set low side signal in response to a feedback signal representative of an output of the power converter, wherein the control circuit is further coupled to output a high side drive signal to a high side switch in response to a set high side signal, and wherein the control circuit is further coupled to output a low side drive signal to a low side switch in response to a set low side signal to control switching of the high side switch and the low side switch to control a transfer of energy from the input of the power converter to the output of the power converter; and
an adaptive deadtime circuit coupled to receive the pre-set high side signal and the pre-set low side signal from the control circuit, wherein the adaptive deadtime circuit is further coupled to receive a voltage sense signal from a threshold detection circuit coupled to a half bridge node of the power converter, wherein the half bridge node is coupled between the high side switch and the low side switch coupled to an input of the power converter, and wherein the adaptive deadtime circuit is coupled to output the set high side signal and the set low side signal in response to the pre-set high side signal, the pre-set low side signal, and the voltage sense signal,
wherein the adaptive deadtime circuit comprises:
first and second capacitors that are coupled to be discharged in response to the pre-set low side signal;
a delay circuit having an input coupled to receive the voltage sense signal;
a first comparator including a first input coupled to receive a delayed voltage sense signal from an output of the delay circuit, wherein the first comparator further includes a second input coupled to a reference voltage, wherein the first capacitor is coupled to be charged in response to an output of the first comparator;
a first logic gate having a first input coupled to receive the pre-low side signal, and a second input coupled to the output of the first comparator, wherein the first logic gate is further coupled to output the set low side signal;
a second comparator including a first input coupled to the first capacitor, and a second input coupled to the second capacitor, wherein the second capacitor is coupled to be charged in response to an output of the second comparator; and
a second logic gate having a first input coupled to receive the pre-high side signal, and a second input coupled to the output of the second comparator, wherein the second logic gate is further coupled to output the set high side signal.

2. The controller of claim 1, wherein the threshold detection circuit comprises a field effect transistor (FET) coupled between the half bridge node and the adaptive deadtime circuit, wherein the threshold detection circuit is coupled to output the voltage sense signal to the adaptive deadtime circuit in response to a voltage at the half bridge node.

3. The controller of claim 1, wherein the threshold detection circuit comprises a junction field effect transistor (JFET) coupled between the half bridge node and the adaptive deadtime circuit, wherein the threshold detection circuit is coupled to output the voltage sense signal to the adaptive deadtime circuit in response to a voltage at the half bridge node.

4. The controller of claim 3, wherein the voltage sense signal is responsive to a difference between a gate to source voltage of the JFET and a pinch off voltage of the JFET.

5. The controller of claim 1, wherein the first capacitor is coupled to be charged from a first current source in response to the output of the first comparator, and wherein the second capacitor is coupled to be charged from a second current source in response to the output of the second comparator.

6. The controller of claim 1, wherein the adaptive deadtime circuit coupled is further coupled to output the set high side signal and the set low side signal to adjust a deadtime of the high side switch and the low side switch to allow zero voltage switching (ZVS) operation.

7. A controller for use in a power converter, comprising:
a control circuit coupled to a half bridge node of the power converter, wherein the half bridge node is coupled between a high side switch and a low side switch coupled to an input of the power converter, wherein the control circuit is coupled to output a high side control signal and a low side control signal in response to a feedback signal representative of an output of the power converter to control a transfer of energy from the input of the power converter to the output of the power converter;
a high side slew detection circuit coupled to receive the high side control signal, wherein the high side slew detection circuit is coupled to the half bridge node and a Miller capacitance of the high side switch, and wherein the high side slew detection circuit is further coupled to output a high side drive signal to the high side switch in response to the high side control signal, the Miller capacitance, and the half bridge node; and
a low side slew detection circuit coupled to receive the low side control signal, wherein the low side slew detection circuit is coupled to the half bridge node and a Miller capacitance of the low side switch, and wherein the low side slew detection circuit is further coupled to output a low side drive signal to the low side switch in response to the low side control signal, the Miller capacitance, and the half bridge node, wherein the high side slew detection circuit comprises:

a first logic gate coupled to output a drive low signal in response to the high side control signal and a power on signal;

a maximum deadtime timer coupled to receive the drive low signal;

a minimum deadtime timer coupled to receive the drive low signal;

a second logic gate coupled to output a force drive signal in response to the drive low signal and the maximum deadtime timer;

a third logic gate coupled to output a hold signal in response to the drive low signal and the minimum deadtime timer;

a fourth logic gate coupled to output an active mode signal in response to the drive low signal, a disable active signal, and a drive high signal;

a pull up predriver coupled to output a pull up gate driver signal in response to the drive low signal and the drive high signal;

a digital output driver coupled to output the high side signal in response to the pull up gate driver signal and the drive low signal;

an active gate driver coupled to receive the pull up gate driver signal, the active mode signal, and the high side signal;

a sense gate driver coupled to output a sense gate driver signal in response to the active gate driver and the active mode signal;

a first Schmitt trigger coupled to receive the high side signal;

a fifth logic gate coupled to output a clock signal in response to the first Schmitt trigger and the sense gate driver signal; and a flip flop coupled to output the drive high signal, wherein the flip flop is coupled to be clocked in response to the clock signal, wherein the flip flop is coupled to be set in response to the force drive high signal, and wherein the flip flop is coupled to be reset in response to the hold signal.

8. The controller of claim 7, wherein the active gate driver comprises:

a first transistor having a drain coupled to the pull up signal;

a first current source coupled to the first transistor and the first active signal; and a second transistor having a source coupled to the first current source and the drain of the first transistor, wherein a drain of the second transistor is coupled to the high side signal.

9. The controller of claim 8, wherein sense gate driver comprises:

a third transistor having a gate coupled to the drain of the first transistor;

a fourth transistor having a source coupled to a drain of the third transistor;

a level shift circuit coupled to a gate of the fourth transistor;

a second current source coupled to a drain of the fourth transistor, and coupled to the active mode signal; and a second Schmitt trigger coupled to output the sense gate driver signal in response to the drain of the fourth transistor.

10. The controller of claim 7, wherein the digital output driver comprises:

a fifth transistor having a gate coupled to the pull up gate driver signal;

a sixth transistor having a gate coupled to a pull gate max signal, and a drain coupled to a drain of the fifth transistor; and a seventh transistor having a gate coupled to the drive low signal, a source coupled to the half bridge node, and a drain coupled the drains of the fifth and sixth transistors, wherein the high side signal is output at the drains of the fifth, sixth, and seventh transistors.

11. The controller of claim 10, wherein the pull up predriver comprises:

a level shift circuit coupled to receive the drive low signal;

an eighth transistor having a gate coupled to the level shift circuit;

a ninth transistor having a source coupled to a drain of the eighth transistor and the pull up gate driver signal, wherein a gate of the ninth transistor is coupled to a voltage source; and a tenth transistor having a drain coupled to a drain of the ninth transistor, and a gate coupled to the drive high signal.

* * * * *